(12) United States Patent
Renner

(10) Patent No.: US 12,061,167 B2
(45) Date of Patent: Aug. 13, 2024

(54) DESORBER FOR A SPECTROMETER

(71) Applicant: BRUKER OPTICS GMBH & CO. KG, Ettlingen (DE)

(72) Inventor: Uwe Renner, Leipzig (DE)

(73) Assignee: BRUKER OPTICS GMBH & CO. KG, Ettlingen (DE)

( * ) Notice: Subject to any disclaimer, the term of this patent is extended or adjusted under 35 U.S.C. 154(b) by 0 days.

(21) Appl. No.: 18/153,031

(22) Filed: Jan. 11, 2023

(65) Prior Publication Data
US 2023/0221281 A1  Jul. 13, 2023

(30) Foreign Application Priority Data
Jan. 13, 2022 (DE) .......................... 102022100728.6

(51) Int. Cl.
*G01N 27/622* (2021.01)
*G01N 1/22* (2006.01)
*G01N 27/64* (2006.01)

(52) U.S. Cl.
CPC ......... *G01N 27/622* (2013.01); *G01N 1/2247* (2013.01); *G01N 27/64* (2013.01); *G01N 2001/227* (2013.01)

(58) Field of Classification Search
CPC ...... G01N 27/00; G01N 27/622; G01N 27/64; G01N 27/626; G01N 27/26; G01N 1/2247; G01N 2001/227; H01J 27/26; H01J 49/00; H01J 49/02; H01J 49/004; H01J 49/04; H01J 49/0431; H01J 49/049; H01J 49/10; H01J 49/126; H01J 49/14; H01J 49/24

USPC ......................................... 250/281, 282, 288
See application file for complete search history.

(56) References Cited

U.S. PATENT DOCUMENTS

| 2008/0073503 | A1 | 3/2008 | Wu | |
| 2011/0278450 | A1* | 11/2011 | Loucks, Jr. | H01J 49/022 250/290 |
| 2012/0103062 | A1* | 5/2012 | Hsiao | G01N 1/44 250/288 |
| 2012/0199735 | A1 | 8/2012 | Krechmer et al. | |
| 2012/0208004 | A1* | 8/2012 | Wolcott | B01D 69/105 427/244 |

(Continued)

FOREIGN PATENT DOCUMENTS

| CN | 1869648 A | 11/2006 |
| CN | 101427130 A | 5/2009 |

(Continued)

*Primary Examiner* — Jason L McCormack
(74) *Attorney, Agent, or Firm* — Norris McLaughlin, P.A.

(57) ABSTRACT

A desorber for a spectrometer, comprising a housing, which has supply lines and discharge lines for a sample carrier gas, together with a closable opening, and an induction unit arranged in the housing, wherein the induction unit comprises a high-permeability and electrically insulating coil carrier, a coil arranged in the coil carrier, a high-permeability sample carrier that can be removed via the closable opening, wherein the sample carrier is designed as an inductive heating element, for purposes of heating a substance to be desorbed, which is applied to the sample carrier, and the coil carrier and the coil are arranged spaced apart from the sample carrier by a gap, such that the magnetic flux, generated by an alternating current flowing in the coil, flows through the sample carrier via the coil carrier and the gap.

15 Claims, 6 Drawing Sheets

(56) References Cited

U.S. PATENT DOCUMENTS

| | | |
|---|---|---|
| 2016/0233068 A1 | 8/2016 | Arnold et al. |
| 2016/0266018 A1* | 9/2016 | Hirata ...................... G01N 1/34 |
| 2019/0195899 A1 | 6/2019 | Hill, Jr. et al. |

FOREIGN PATENT DOCUMENTS

| | | |
|---|---|---|
| CN | 201561956 U | 8/2010 |
| CN | 105659355 A | 6/2016 |
| CN | 105702553 A | 6/2016 |
| EP | 2671244 B1 | 1/2020 |
| JP | H0689694 A | 3/1994 |
| JP | F09243536 A | 9/1997 |
| WO | 2015/040419 A1 | 3/2015 |
| WO | 2021084230 A | 5/2021 |

* cited by examiner

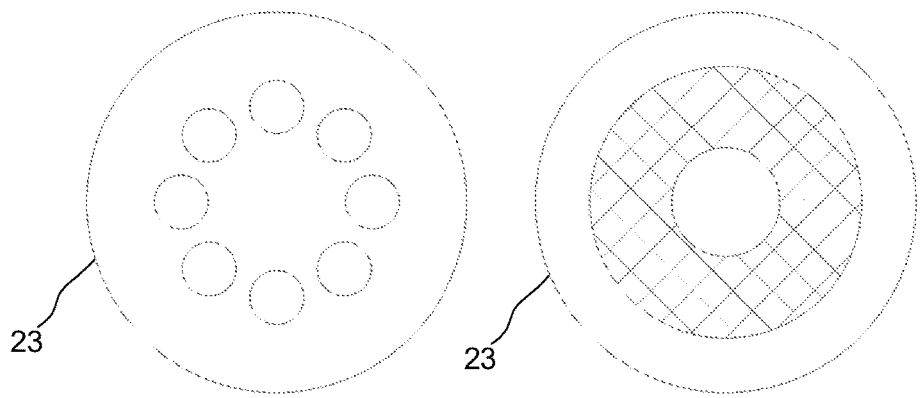
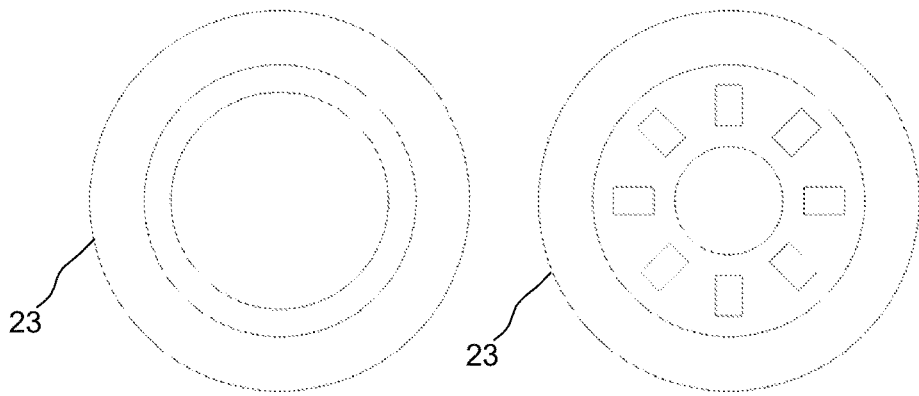
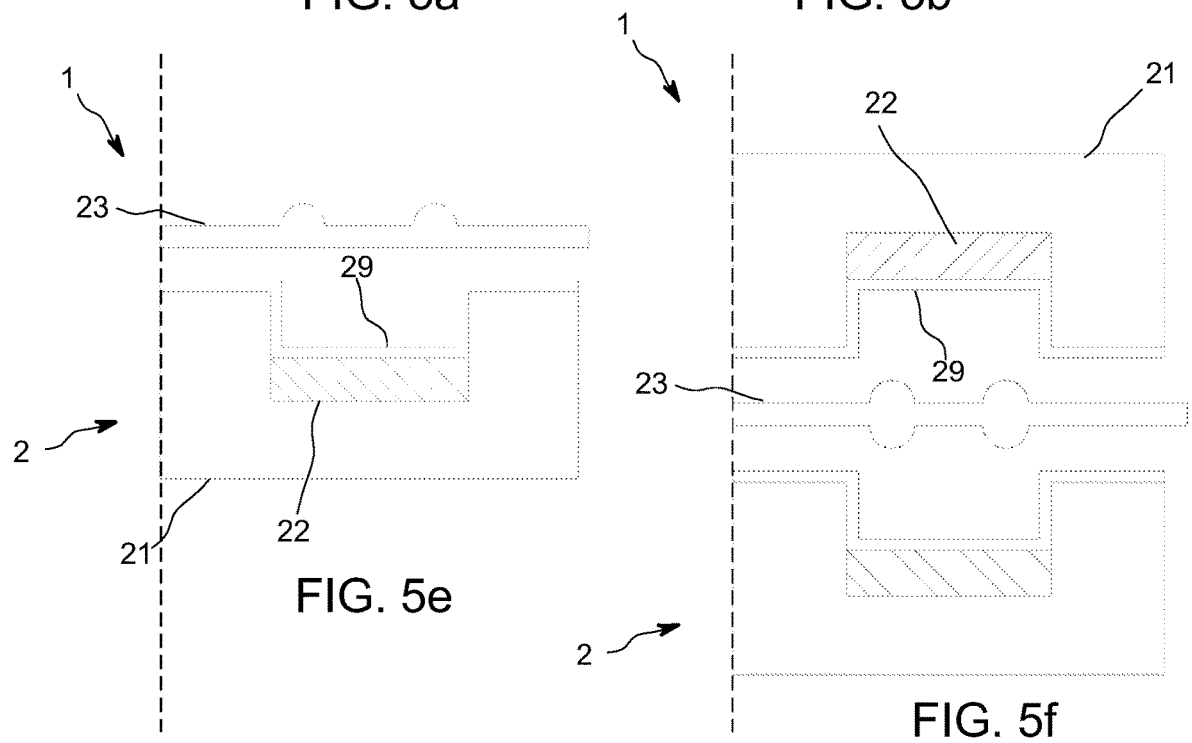

DESORBER FOR A SPECTROMETER

BACKGROUND OF THE INVENTION

The invention relates to a desorber for a spectrometer, in particular for an ion mobility spectrometer, which comprises a housing, which has supply and discharge lines for a sample carrier gas, together with a closable opening, and comprises an induction unit arranged in the housing, together with an ion mobility spectrometer with such a desorber, and a method for the desorption of substances of medium and low volatility at high temperatures, and provision of the desorbed substances in an ion mobility spectrometer with a desorber in accordance with the preamble of the independent patent claims.

For the investigation of substances in a spectrometer, in particular in an ion mobility spectrometer, substances of medium volatility and in particular low volatility must be brought from a sample carrier into the gas phase in a controlled manner in a short period of time and with minimal energy consumption. This requires the generation of a high temperature.

The desorption, that is to say, the release of a substance from the surface of a sample carrier, that is to say, the conversion from a fluid to a gaseous state (evaporation), or from a solid to a gaseous state (sublimation), is determined by the enthalpy of evaporation or sublimation respectively, depending on the substance concerned. The released gaseous substance fraction, which subsequently accumulates in the sample carrier gas, and is usually characterized by the partial vapour pressure, is in many cases an exponential function of the temperature, in an analogous manner to the Arrhenius equation. In the latter, the activation energy also determines the reaction rate as a function of the temperature. Accordingly, a distinction is made between substances that are of more or less volatility. Although in the course of detection, the mostly unknown substances show a very different desorption behaviour, the desorption is usually executed at a fixed temperature as a compromise, owing to the lack of suitable devices.

Also, it is frequently the case that only salts with a low desorption temperature, such as ammonium nitrate and urea nitrate, are detected with ion mobility spectrometers. These can be evaporated or sublimated by desorbers that operate at low operating temperatures, since the substances mentioned desorb at temperatures below 250° C.

In contrast, the generation of higher temperatures for use in ion mobility spectrometers requires much expenditure in terms of thermal insulation. On account of the large mass of the desorber, in particular that of the wall featuring the insulation, time-consuming preheating is also necessary until the required temperature is reached. A further disadvantage is that after a longer waiting time, the unit is often only ready for operation after several minutes. This problem is exacerbated by higher targeted temperatures. In particular in mobile applications with limited energy capacities, the continuous heating that is necessary limits the duration of operational readiness. Due to the sluggish reaction to the regulation variables such as voltage or current, a stepwise or profile-controlled temperature-dependent desorption is only possible with a time delay.

The invention relates to the detection of substances of medium and low volatility in spectrometers, in particular ion mobility spectrometers, in particular of salts with a high sublimation enthalpy. In order to achieve a detectable vapour pressure, that is to say, a sufficient concentration in accordance with the gas state equation, a high temperature is required. However, the temperature must not become too high, since otherwise chemical conversion processes can take place, for example, when oxygen is present in the sample carrier gas, which in the worst case can lead to fewer specific products. An optimal desorption temperature can therefore be specified for a known substance. In many cases, such as in detection applications that are searching for detectable substances, it can therefore be advantageous to increase the temperature in a targeted and time-controlled manner, thus achieving a separation of the substances depending on the sublimation enthalpy, such that these substance classes can be investigated chromatographically. On account of the large mass and thermal capacity of most desorbers, the temperature can only be set with a considerable time delay and, in particular, can only be cooled down very slowly to an initial value.

The sample is usually wiped or pipetted onto a sample carrier, which is usually in the form of a strip. The sample carrier is supplied by inserting it into what is often a slit-shaped opening, which can also be closed. For this purpose, the strip is made of heat-resistant materials, such as a special paper, or a composite compound of Teflon and glass fibres. As determined by the material, such sample carriers are hardly able to withstand temperatures higher than approx. 250° C. in continuous use without damage.

State of the Prior Art

In the prior art the direct heating of the sample strip is then carried out by press contact with a flat heat source. The actual heater is directly connected to the heating surface. In the case of surface heaters, however, it is unavoidable that, in addition to the usable contact heating surface for transferring the heat to the sample carrier, an at least equally large unusable surface is also heated, the heat of which, unused, must be dissipated to the environment, resulting in a low energy efficiency. The desorbed sample enters the ion mobility spectrometer by way of a carrier gas flow.

For the transfer of the substance into a sample carrier gas flow, the near-surface diffusion and local convective transport are other significant factors, because the gas velocity of the passing sample gas flow is zero due to surface friction, wherein in addition to the roughness, the temperature of the near-surface layer is also significant. At higher temperatures, the gas molecules move more quickly away from the heat source, and thus enter into the sample gas flow, with which they mix. Due to the low operating temperatures of the usual desorbers, the mixing is consequently also unsatisfactory.

Furthermore, wires or thin ceramic heaters are also used directly as sample carriers. These must be connected to a power supply via contacts after each insertion, and disconnected from the contacts after removal. The disadvantage here is the possible wear and contamination of the contacts, which would have to be coated with gold, for example. In order to achieve a low thermal capacity, the ceramic heater would have to be very thin, which makes it susceptible to breakage.

Heating elements together with their attachment, for example, to a housing wall, are often of solid construction, and must themselves be heated, for which an initial energy is required that depends on the thermal capacity of the heater. In conjunction with the losses previously mentioned, these also cause a delay until the desired operating temperature such as the contact temperature, that is to say, readiness for operation, is reached. The electrical (metallic) supply lines to the heat source also belong among the loss elements. This is because a high electrical current flows through them in order to achieve the necessary heating power, but because of the high electrical conductivity to avoid the supply line losses, a high heat loss flows away from the heat source, due to the high thermal conductivity.

Another possibility described in US2012199735 AA and EP2671244 B1 for the generation of a high temperature for purposes of desorbing the sample is to use a wire grid as a sample carrier, through which an electric current flows. Here, the sample is transported to the ion mobility spectrometer by a gas flow. Since direct heating here takes place through the wires through which the current flows, heat is also lost into the environment via the power supply wires.

WO 2015/040419 A1 describes a spectrometer. which comprises a coil that heats a heating element. The heating element in turn heats a sample collector, on which a sample to be desorbed is located.

An inductive heater basically comprises an induction source, consisting of a coil in which a time-varying magnetic field, that is to say, a time-varying magnetic flux, is generated by an alternating current, and a source of metallic material, through which the magnetic flux flows as magnetic eddies, via magnetic field conductors and back to the induction source. The coil is formed by the total number of turns of wire, or stranded wire, that contribute to the magnetic flux through the source material. The electric eddy current field j is induced at right angles to the magnetic eddy field. The ohmic power dissipation P is determined from the volume integral of the product formed by the resistivity and the absolute square of the vector field of the electric current density j in the material concerned. With a high current density, and as a result of the electrical resistance, the desired heat loss is generated to heat the source.

SUMMARY OF THE INVENTION

The invention is now based on the object of providing a device and a corresponding method, which at least partially overcome the above-mentioned disadvantages of the prior art, and provide substances with a high desorption temperature for detection by a spectrometer, in particular an ion mobility spectrometer, in a desorbed state in a short period of time with low energy consumption, that is to say, a high energy efficiency. Such substances take the form, for example, of substances that are to be desorbed at high temperatures, such as salts, in particular those salts that are used as oxidizing agents in the ignition (primary explosives) of explosives or fireworks. Examples of salts that require a higher desorption temperature are manganates such as potassium permanganate, nitrates such as potassium nitrate, and many sulphates and chromates. In addition to the detection of hazardous substances in the safety sector, further analytical fields of application are to be developed, for example in the environmental sector for the detection of heavy metal compounds, using ion mobility spectrometry.

Furthermore, since an unknown variety of substances is often anticipated when extracting and examining samples, and since, accordingly, these substances desorb at different temperatures, a wide and rapid temperature control is required that achieves various temperatures in a short period of time. In particular, by this means substances can be specifically brought into the gas phase in a short period of time, and can be supplied to, or removed from, the ion mobility spectrometer in a sample carrier gas flow.

This object is achieved by a desorber and a corresponding method with the features of the independent claims. Advantageous configurations of the invention are defined in the subsidiary claims. For this purpose, arrangements are described for the desorption of substances of medium and low volatility at high temperatures from an electrically conductive, metallic sample carrier of high relative permeability with a value of more than 100, and a low thermal capacity of preferably less than 10 J/K, in the form of a desorber with inductive heating. Such a thermal capacity is achieved by means of a low volume, and in particular by means of a low wall thickness, for the sample carrier. By this means a rapid alteration of the desorption temperature is possible. The heat and temperature levels necessary for this purpose are furthermore to be achieved by an optimization of the desorber and the sample carrier.

In accordance with the invention, a desorber for a spectrometer, in particular for an ion mobility spectrometer, is provided, which comprises an essentially closed housing, which has supply and discharge lines for a sample carrier gas, together with a closable opening, and an induction unit arranged in the housing. The induction unit comprises a high-permeability and electrically poorly conducting, preferably electrically insulating, coil carrier. In particular, the coil carrier has an electrical conductivity of less than 1,000 S/m, preferably less than 100 S/m, and particularly preferably less than 1 S/m. A coil is arranged in the coil carrier. Furthermore, the induction unit comprises a high-permeability sample carrier that can be removed via the closable opening, wherein the sample carrier is designed as an inductive heating element, in order to heat a substance, applied to the sample carrier, that is to be desorbed. The coil carrier and the coil are spaced apart from the sample carrier by a gap. The sample carrier is arranged such that a magnetic flux, which is generated by an alternating current flowing in the coil, flows through the sample carrier via the coil carrier and the gap. The removable sample carrier serves to acquire the substances to be detected and transfer them into the interior of the desorber.

In the context of the basic invention, the term "coil" should not necessarily be associated with a simple wire coil. The inventive coil can be such a coil, but is by no means limited to such a coil, as the following explanations and statements make clear. Thus, the term "coil" here also includes the space, that is to say, the volume, that is filled by a coil, however the latter is specifically wound. In general, coils are spirals that are wound both in a single layer as a pure cylindrical coil along a cylindrical axis, usually with a uniform internal diameter, or are layered on top of each other in multiple layers. The multi-layer spiral rolled out in one plane (for example, an Archimedean spiral) can also be counted among these. Thus, different geometries can be formed by the inventive coil, such as in the case of a cylindrical coil, a toroidally shaped cylindrical coil, or an Archimedean spiral-shaped coil.

With regard to the field path of the magnetic field, provision is preferably made for the relative arrangement of coil, coil carrier, and sample carrier to be designed in such a way that the magnetic flux generated by the coil flows completely through the sample body in such a way that an electric eddy current is generated in the sample carrier at right angles to the magnetic flux, and heat is dissipated by the electrical resistance present in the outer skin layer of the sample carrier. For this purpose, the magnetic flux, which ideally flows back to the coil in a closed loop, must be supplied to, and discharged from, the sample carrier via a narrow gap.

The desorber preferably comprises an electronic control and regulation unit, which, amongst other functions, serves to control the inductive heating by variation of the alternating current of the sample carrier, and thus of the sample. The inductive heating of the sample carrier is preferably controlled by the electronic control and regulation unit, and can take place either rapidly in a short period of time, in steps, or in accordance with a specified timewise profile, up to a final temperature. Advantageously, a target temperature profile is defined, wherein the temperature profile characterizes the ideal, that is to say, the desired temperature profile of the sample carrier, and the electronic control unit controls the inductive heating in such a way that this temperature profile is achieved by heating the sample carrier. By this means, a wide range of temperatures is advantageously achieved for an unknown substance, and improved detection is thus also achieved, since different substances are also desorbed. The electronic control and regulation unit preferably comprises a current sensor, for example, a current measuring resistor (shunt), for purposes of measuring the current intensity through the coil, and/or a sensor coil that is designed for purposes of measuring the magnetic flux generated by the coil. Depending on the measured values of the current sensor, and/or the sensor coil, the current intensity of the current flowing through the coil can be adjusted by means of a regulable current or voltage source, together with the frequency f of the control function, for example of the changeover switch.

The desorber preferably also comprises a sensor system, which is designed to detect a sample carrier in the desorber, and to start the desorption process when the sample carrier is in the interior of the desorber.

For purposes of connection in an ion mobility spectrometer, the unit has appropriate supply and discharge lines for the sample carrier gas flow. In an advantageous embodiment, the latter comprise the electronic control and regulation unit and, in the case of a temperature measurement of the sample carrier, additionally deployed sensors.

Furthermore, the coil carrier preferably has a minimum cross-sectional area for the coupling in and coupling out of the magnetic flux, wherein the cross-sectional area is preferably less than 50% of the sample carrier area, which is facing towards the arrangement of coil carrier and coil, the heat conduction across the gap is proportional to the minimum cross-sectional area, and thus in this form of embodiment a minimum heat conduction is advantageously ensured.

High-permeability materials are understood to be ferromagnetic substances, whose permeability numbers (relative permeabilities) are greater than 10, preferably greater than 100, and particularly preferably greater than 1,000.

The high-permeability sample carrier, in contrast to the usual sample carriers made of special paper, or a composite compound of Teflon and glass fibres, allows much higher temperatures than, for example, 250° C., which can be up to, for example, 700° C. Only above the Curie temperature does a high-permeability sample carrier lose its advantageous magnetic properties. In ferromagnetic materials, in addition to the ohmic losses mainly used for heating, the losses caused in alternating magnetic fields by magnetic rearrangements (hysteresis) are added as a heat source.

Without an outer layer, the sample carrier is formed only by a core. In this case, there is no protection against mechanisms such as oxidation. This embodiment is then particularly suitable for applications in which the sample carrier is used as a disposable article, or is subsequently regenerated for reuse.

The sample carrier preferably comprises a core surrounded by an outer layer, which forms the surface of the sample carrier. The core of the sample carrier preferably consists of a metallic material with an electrical conductivity of more than $1 \cdot 10^6$ S/m, preferably more than $5 \cdot 10^6$ S/m, and particularly preferably more than $10 \cdot 10^6$ S/m, and a magnetic permeability of more than 10, preferably more than 100, and particularly preferably more than 1,000. As an example, the core preferably consists of iron, nickel and cobalt. or alloys thereof. Many alloys of iron, nickel and cobalt have in some cases even higher relative permeability values with comparatively high electrical conductivity, and are also preferred. In addition, many unalloyed standard steel grades, that is to say, steel without carbon admixture such as spring steel strip, fulfill the requirement for high permeability and high electrical conductivity and are likewise preferred as core material. Since a significant part of the sample carrier, the core, consists of this material, the magnetic flux through the sample carrier and the induced electrical eddy flux occur in a thin layer close to the surface, which is specified as a characterizing measure by the penetration depth due to the skin effect. Since the ohmic power dissipation is produced to a large extent in this layer, the thickness of the sample carrier can be reduced to a few microns at the high frequencies. The order of magnitude for this is around 10 μm thickness at a frequency of about 120 kHz. The sample carrier can then be made from thin sheets or foils. For example, at a frequency of 50 kHz, the penetration depth of the alternating magnetic field for copper is about 295 μm, for pure iron about 11 μm, and for pure nickel about 22 μm. With platinum as the surface coating and iron as the core material, with a layer thickness of 100 μm and a frequency of the magnetic flux of 75 kHz, the electrical power dissipation reaches a maximum at a layer thickness of approx. 15 μm. The magnetic flux through the core displaces a fraction of the eddy current into the more lossy surface layer around the core, resulting in a higher power dissipation than if the surface layer consisted of the core material.

A significant advantage of the inventive desorber is that the sample carrier is used directly for desorption of the substances of low volatility, without the need for an additional heater to heat the surface supporting the substance. The sample carrier is heated directly, that is to say, without contact heat transfer to the sample carrier, and without electrical supply lines to a heat source located in the sample carrier.

As a consequence of the skin effect, a high-frequency electrical eddy current with a high current density is induced in a thin layer of the sample carrier close to the surface; this generates an ohmic power dissipation through the resistance of the sample carrier material, and thus causes an increase in the surface temperature. The low penetration depth of the magnetic field due to the skin effect thus enables both the magnetic flux and the flow of electric current to take place largely in the layer close to the surface. This enables the production of thin sample carriers with a small thermal capacity. Thus, on the one hand, a very high surface temperature can be achieved in a short period of time. On the other hand, the short delay time enables the controlled temperature-specific desorption of substances via a regulation of temperature.

A further significant feature of the invention is that the sample carrier, in addition to the coil and the accommodating coil carrier, is a component of the circulating magnetic flux. The sample carrier forms a magnetic unit with one or also a plurality of coil carriers distributed over the sample carrier, in which one or a plurality of separate closed magnetic eddies flow through the sample carrier. The coil is embedded in the coil carrier, which guides the magnetic flux from the coil via a gap to the sample carrier, and from the latter back into the coil. The gap serves on the one hand as the entry from the coil carrier into the sample carrier, and on the other hand as the exit from the sample carrier into the coil carrier.

The width of the gap is defined by the coil carrier, attached to the wall of the desorber, and the sample carrier. In a preferred embodiment, the induction unit comprises at least one spacer, wherein the at least one spacer is designed to hold the sample carrier, and variably to adjust a width of the gap. Here the gap has a width of more than 0.1 mm and less than 1 mm. This ensures a reduced and controlled heat loss from the sample carrier to the coil, and an improved magnetic flux from the high-permeability coil carrier to the sample carrier. In the desorber, the sample carrier is fixed to the wall of the housing by the spacer; these together have a low heat dissipation due to thermal conduction. To reduce heat dissipation further, the spacer preferably has a small-area fixing for the sample carrier, designed as a sample carrier holder, for example in the form of pins or clips.

The coil carrier and the sample carrier are preferably arranged opposite each other, and are separated by the gap. Due to the gap, the inductance of the arrangement (coils, coil carrier, sample carrier) advantageously depends only slightly on the permeability of the magnetic components when using high-permeability materials for the coil carrier and sample carrier, so that this property has a stabilizing effect, for example on the position of the resonant frequency, in particular when the permeability of the sample carrier changes as a result of the temperature change during heating. A narrow gap makes possible a high magnetic flux and reduced radiation as a result of the magnetic field divergences into the environment. The gap distance is defined by the attachment of the coil carrier, and the attachment of the sample carrier holder to the wall of the desorber.

The gap between the coil carrier, with the coil, and the sample carrier, enables a reduced and controlled heat loss from the sample carrier to the coil, and an improved magnetic flux from the high-permeability coil across the narrow gap to the high-permeability sample carrier, and from the latter back across the gap into the coil. It also provides electrical insulation between the coil carrier, with the coil, and the sample carrier. By fixing the width of the gap, the arrangement described has a defined inductance that is largely independent of the permeability of the coil carrier and sample carrier when the permeability is high. This property, in the form of a defined width of the gap, is used in toroidal cores and also in pan cores, and can be justified in terms of Ampère's law. Thus, a defined resonant operation in a resonant circuit with a defined frequency is made possible. Since the magnetic flux passes directly through the narrow gap, its leakage into the environment of the desorber and any associated electromagnetic interference is reduced (EMC). In addition, the gap provides thermal insulation, which reduces heat loss from the sample carrier to the coil carrier or other components.

The coil comprises a number of turns of a current-carrying conductor in order to increase the magnetic flux, and is arranged in the coil carrier, which leads the magnetic flux to the sample carrier. The chamber of the coil carrier is preferably characterized by a high volume fraction of the conductor, or conductors forming the coil, on the one hand to achieve a high number of turns for purposes of increasing the magnetic flux, and on the other hand so as to enable a high electric current, that is to say, a high current density, in the sample carrier. The ratio of the volume of the coil formed by the conductors and the volume surrounding the coil (the convex envelope) determines the fill factor. A high fill factor can be achieved in particular by a suitable cross-sectional shape of the conductor, for example square, hexagonal or honeycomb. The fill factor is preferably at least 0.9, further preferably at least 0.95, and particularly preferably at least 0.99. The conductor is preferably electrically insulated and particularly preferably is constructed from many individual wires as a multi-core stranded wire, wherein the multi-core stranded wire comprises electrically insulated individual wires. Advantageously, the electrical conductor of the coil, which preferably comprises aluminium and/or copper, has both a high electrical conductivity and a high thermal conductivity, and can thus conduct not only its own comparatively low heat loss, but also the heat transferred by the indirect contact with the sample carrier. Since even with a high fill factor of at least 0.9 of the coil carrier chamber, a poorly heat-conducting gas volume remains between the conductors, and in particular in the transition region from the coil to the coil carrier, this is preferably filled by a material that is a better heat conductor than air. This can preferably take the form of a thermally conductive paste or a thermally conductive resin. The said material has a thermal conductivity of at least 0.05 W/(mK), preferably at least 0.1 W/(mK), and particularly preferably at least 0.5 W/(mK). In particular, the coil impregnated with the thermally conductive material can be encapsulated in the coil carrier with the thermally conductive material, and thus fixed in the coil carrier so as to make contact with the latter. To avoid outgassing of the coil and to prevent substance deposits during desorption, an inert protective layer is preferably located on the side of the coil facing towards the sample carrier, or making contact with the latter.

The coil required for generating the magnetic field is preferably countersunk in the coil carrier (ferrite) in a tub, so that the coil has the greatest possible separation distance h from the opposite surface of the sample carrier, without this causing a detrimental effect on the generation of the magnetic flux, while the configuration otherwise remains the same. The larger separation distance of the hot sample carrier surface from the inductive excitation coil, by virtue of the larger insulating gap, advantageously causes a reduction of the lossy heat conduction from the sample carrier surface to the coil, so that higher temperatures can be achieved with the same electrical power. In order that no desorbed sample components can be deposited in this volume, which is recessed by the separation distance h, the volume must be sufficiently purged with the carrier gas (flow: 1-100 l/h), for which purpose the coil carrier has at least one gap-shaped recess (slot) and extends up to the coil, or, if applicable, up to a protective layer arranged on the coil. In addition, it is beneficial if the transition edges of the recesses are beveled or rounded, so as to avoid deposits.

The sample carrier, which also serves as a heater, preferably has a thermal capacity of less than 10 J/K, preferably less than 1 J/K, particularly preferably less than 0.1 J/K, so as to reach high temperatures in the shortest possible time.

A particular advantage of the inventive desorber is that the heating power only has to be provided by the sample carrier during the period of the desorption process, and no preheating is required. After this time period, no heating power is required, so that the sample carrier gas flow, which is much cooler than the sample carrier, can cool down correspondingly quickly both the sample carrier and its environment, which has been heated by thermal conduction or thermal radiation.

In an advantageous embodiment, the desorber is designed as a compact additional module for an ion mobility spectrometer for the desorption of substances of medium and low volatility. In the embodiment as a plug-in additional module, it can be integrated, by way of adapters that are part of the desorber, into the sample carrier gas flow of an ion mobility spectrometer. It can be manufactured with miniaturized dimensions, and is thus suitable for use in mobile ion mobility spectrometers.

The high-permeability and poorly current-conducting coil carrier (see above) that guides the magnetic flux, preferably comprises a material suitable for high frequencies, which even at higher magnetic flux densities, in particular in the range from 0.05 Tesla to approx. 0.5 Tesla, exhibits only a low magnetic saturation behaviour, that is to say, there is a monotonic, almost linear dependence between magnetic flux density and magnetic field strength, given by the relative permeability, and also advantageously has magnetic properties, for example permeability, at higher temperatures, for example in the range from 60° C. to 100° C., that are only slightly dependent on the operating temperature.

In a preferred configuration of the invention, provision is made for the coil carrier to comprise a ferrite. Particularly preferably, the ferrite primarily takes the form of an iron oxide in combination with other substances. In particular, it takes the form of soft magnetic ferrite in combination with MnZn or NiZn. Ferrites have a high permeability.

Particularly preferably, the coil carrier has a relative permeability of more than 10, preferably more than 100, and particularly preferably more than 1,000. This serves to improve the conduction of the magnetic flux. In order to avoid eddy current losses, a high-permeability material that conducts the electric current very poorly, or not at all, is preferably used for the coil carrier. High-permeability materials with high electrical conductivity, such as the metallic examples cited for the sample carrier, for example, iron, are not suitable as the coil carrier material, even if they consist of electrically insulated layers. Iron powder cores such as carbonyl iron powder also have high eddy current losses, and are therefore unsuitable.

In another preferred configuration of the invention, provision is made for the induction unit to comprise a temperature sensor, which is designed to record the temperature of the sample carrier. To this end, in one form of embodiment the temperature sensor is connected to the sample carrier via a thermal bridge, and is attached to the sample carrier holder, for example. Via a thin signal line, the measured temperature value can be recorded outside the desorber by a controller. This enables a temperature-specific desorption of substances. without the temperature sensor that is necessary for this purpose being arranged on the sample carrier in a detrimental manner.

In accordance with another advantageous embodiment, the temperature sensor for the sample carrier is an optical temperature sensor, for example, a pyroelectric sensor. By this means further heat losses can be reduced, by virtue of the avoidance of contact points or surfaces.

The coil carrier preferably covers the entire sample carrier, so that the magnetic flux flows through as much of its entire surface as possible. In the case of a disc-shaped sample carrier, a mirrored arrangement of the coil carrier on both sides is particularly advantageous, since this increases the power dissipation achieved. In addition, radiation from the gap can be compensated for by the counter-rotation of the individual magnetic fields.

In an advantageous configuration of the invention, the coil carrier has a pan and/or tub shape, which is designed to receive the coil. In accordance with a particularly preferred form of embodiment, the coil carrier carrying a magnetic field with a ferrite core in a pan and/or tub shape covers a disc-shaped sample carrier on one side and is designed such that the coil is accommodated in the pan and/or tub. In another particularly preferred form of embodiment, the disc-shaped sample carrier is covered on both sides by the coil carrier. This has the advantage that the ohmic power dissipation is doubled, while the sample carrier thickness is not too small. In addition, the magnetic fields emerging via one or the other gap can compensate each other. In another preferred form of embodiment, the surface (on one or both sides) of the sample carrier is covered by a plurality of, for example, hexagonally shaped coil carriers in which separate coils are arranged; these have their own resonant frequencies, and can also be controlled separately. A circular disc shape is preferred for the sample carrier. For certain applications, for example, as a spatula, an oval, elliptical or stadium-shaped disc shape is also preferred, for which the coil carrier assumes a corresponding covering shape. In the disc-shaped form of embodiment, the edges of the sample carrier are rounded to prevent injury. In another use as a knife for cutting, the sample carrier has sharp edges or notches for sawing purposes.

Advantageously, the pan- and/or tub-shaped coil carrier has an inner cylinder. In this case, the coil is mounted in the coil carrier. Furthermore, the coil is wound around the inner cylinder, or has an opening along its central axis, which is, for example, cylindrical, in which the inner cylinder of the coil carrier is arranged. In a further embodiment, the inner cylinder is preferably perforated, wherein this hole serves to receive a screwable tuning core for purposes of tuning the inductance, or, in one form of embodiment of the desorber, is used for gas transport.

In another preferred form of embodiment, the coil carrier has a U-shaped, axially-symmetrical form. An annular or toroidal coil, with a preferably rectangular cross-section, is inserted in the coil carrier. A cylindrical opening is thus created along the central axis, in which a cylindrical sample carrier is located. The coil surrounds the sample carrier, in the manner of a traditional coil with a core. The axially-symmetrical magnetic flux occurs via one leg of the U-shaped coil carrier, through a narrow gap to the sample carrier, and along a thin surface layer of the sample carrier, corresponding to the penetration depth of the magnetic field, and back again via another narrow gap via the other leg of the U-shaped sample carrier. The induced flow of current thus occurs at right angles to the magnetic flux in the surface layer over the outer circumference of the sample carrier. This results in embodiments of the sample carrier in the form of cylindrical geometries such as (thin-walled) cylinders, with and without a floor, pins or spikes. The sample can thus be collected, for example, by piercing. In a special surface-hardened form of embodiment, one edge of the sample carrier is shaped as a drill, or cutter, or grinder. In another preferred form of embodiment, the sample carrier is a hollow cylinder, or a thin-walled sleeve, wherein in another form of embodiment one edge is suitable for piercing, and in another form is toothed for sawing.

Even if an axially-symmetrical design of the sample carrier, and thus of the coil carrier, is preferred for eddy current generation, oval or rectangular designs are also possible. Accordingly, the coil carrier, or a plurality of coil carriers, should cover the surface of the sample carrier. In particular, a small gap must be maintained between the sample carrier and the coil carrier. Overhanging sample carrier surfaces or volumes unnecessarily increase the thermal capacity and are sources of heat flow losses.

In an advantageous configuration of the invention, provision is made for the housing to have an inert, heat-reflecting coating on the side facing towards the induction unit. In this case, the entire interior of the desorber housing is provided with a heat-reflecting coating. Particularly preferably, the coating is arranged on a replaceable insert, for insertion into the housing. In particular, the regions of the chamber in which the sample carrier surface and the coil face each other can be provided with a smooth, heat-reflecting layer (for example, glass), and/or a pigment layer, on the side of the housing. The pigment layer preferably comprises titanium oxide and/or a metallic powder. It preferably takes the form of a low-outgassing protective layer, formed prior to the penetration of sample gases into the coil.

Advantageously, a thin heat-reflecting, bright metallic or reflective protective layer is preferred for the entire surface of the coil opposite the sample carrier.

The interior of the housing is preferably filled with a gas that completely surrounds the sample carrier. This provides a heat-insulating layer to the wall, which reduces heat conduction losses. Advantageously, the gas during desorption takes the form of an inert gas, in particular nitrogen, or a noble gas, in particular argon, and otherwise air at ambient air pressure. In principle, the use of only one of the aforementioned gases during each step of the method also offers advantages over a method without the use of a gas. In most applications, the gas in the desorber is air. In order to avoid oxidation and any associated decomposition of the substances, in particular at higher temperatures, the interior of the desorber can preferably be filled with an inert gas such as nitrogen. or with a noble gas such as argon. during desorption.

In a further advantageous embodiment, negative pressure prevails in the housing during desorption. The gas pressure in the desorber does not necessarily have to correspond to the ambient pressure during the desorption process. In particular, desorption can also take place at a reduced pressure, so that the products can be transferred more easily into a low-pressure ion mobility spectrometer.

In accordance with a preferred embodiment, the sample carrier comprises a sample contact zone that has structural features to improve the acquisition of the sample, and to improve the desorption capability. While the magnetic field transition region relates to the transition region of the magnetic flux into the sample carrier, the sample contact zone primarily characterizes the surface of the sample carrier that serves the acquisition or deposition of the sample or substance. In accordance with this embodiment, the sample contact zone has structures and/or coatings that have a higher emissivity for functional reasons. In general, all forms of surface area enlargement, with as little or no increase in volume as possible, are preferred (these are also preferred with regard to the increase in ohmic resistance at the surface as a result of extended paths); they contribute to an increase in power dissipation with the same total magnetic flux. The enlargement is particularly preferably achieved, for example, by roughening or by indentations, resulting in reticulated, corrugated, wavy, or porous textures. To improve the sample receptivity for fluids that are to be evaporated, the sample carrier has, as preferred structural features, narrow, somewhat raised edges around the sample contact zone, which are formed from the sample carrier material as a barrier, collar or the like, so that pan-shaped acquisition surfaces are advantageously created. Also preferred are a plurality of trough-shaped depressions in the sample contact zone to prevent the fluid from flowing away. To improve substance transport via the sample carrier gas, in a preferred embodiment the sample carrier has pore- or slit-shaped openings that are distributed over the sample collection zone.

To reduce heat radiation losses, a thin, bright metallic coating with a thickness of less than 5 μm with low electrical conductivity is preferably applied in the magnetic field transition region of the coil carrier. Preferably, this is additionally interrupted by segmentations, for example so as to minimize the occurrence of parasitic electrical eddy fluxes.

Particularly preferably, the sample carrier is surface-structured in the predetermined sample contact zone (in the case of a disc, this is not the centre, but a circular ring between the centre and edge of the sample carrier, due to the coupling in and out of the magnetic field) in order to achieve an increase in the surface adhesion, that is to say, in the collection capacity of the substances, compared to an untreated surface, as a result of the increase in surface area.

Particularly preferred is a coating of the sample contact zone with a material such as stainless steel, nickel alloys, platinum, titanium, titanium nitride, titanium aluminium nitrides, or similar metal nitrides, which coating has a higher resistivity than the more conductive core material, and thus produces a higher power dissipation in the sample carrier, with similar magnetic fluxes through the coil carrier. Coatings made of titanium aluminium nitrides additionally show a high oxidation resistance, for example, compared to titanium nitride, even at very high temperatures. The reason for this is that the flow of electric current is displaced by the magnetic flux onto the surface. With increasing layer thickness, the power dissipation also increases to a maximum.

The magnetic flux transition zone between the coil carrier and the sample carrier has particularly good heat-reflecting properties, with a reflectance of preferably greater than 0.8. In addition, a thin heat-reflecting, bright metallic or reflective coating with a low electrical conductivity, such as titanium, titanium nitride, titanium aluminium nitrides, or similar metal nitrides, is particularly preferred for the sample contact zone. In this case, the entire surface of the sample carrier is particularly preferably covered. In another form of embodiment, the protective layer serves to coat the electrically insulating coil carrier material, which usually has poor heat-reflecting properties, and therefore requires a heat-reflecting protective layer.

Many salts have high sublimation enthalpies, and therefore sublimate slowly; any reaction products or decomposition products are only formed with a time delay. In addition to the chemically passive coating, a catalytic reaction coating of, for example, porous (for example, galvanized) platinum or nickel, of the sample collection zone is therefore preferably deployed; this provides reaction products that can be better detected by catalytic reactions. The chemically inert coating should also be resistant in particular to acids, so that chemical reactions can take place on the sample carrier to produce more detectable reaction products. Also preferred is a multilayer structure with an inert layer between the core material and the catalytic reaction coating.

A layer, for example, a glass layer, with very good heat-reflecting properties is preferably located opposite the sample contact zone on the side of the housing. The degree of heat reflection should therefore be greater than 0.5, but preferably greater than 0.8, and particularly preferably greater than 0.95, for the wavelength of heat radiation emitted by the sample carrier contact zone.

In a preferred configuration of the invention, provision is made for the surface of the sample carrier to have a low emissivity of less than 0.5 for the thermal radiation emanating from the sample carrier. This minimizes the heat radiation from the surface of the sample carrier. In particular, a low emissivity is present in the magnetic field transition region. The magnetic field transition region is understood to be the region of the sample carrier where the magnetic flux from the coil carrier enters into the sample carrier via the gap. By virtue of the high temperature difference of the hot sample carrier compared to the much colder surrounding wall of the desorber, a high heat loss as a result of the radiation transfer would occur in accordance with the Stefan-Boltzmann law. This is because, in accordance with this law, the heat loss is proportional to the fourth power of the absolute temperature. The heat loss is largely determined by the emissivities and visibility factors of the radiating surface of the hot body, in this case the sample carrier, and the colder surfaces opposite it. Accordingly, it is advantageous in terms of reduced power dissipation if the radiating sample carrier surface is minimized and has an emissivity close to zero. By virtue of its metallic nature, the surface of the sample carrier usually already has a low emissivity. A particularly smoothly polished, heat-reflecting surface, with a very low emissivity of less than 0.1, is particularly preferred here. This can be achieved, amongst other measures, by a thin coating of gold. The coil carrier material on the opposite side does not then necessarily require a reflective coating, which would narrow the heat-insulating gap.

The reflectance of all surfaces opposite the hot sample carrier should preferably be greater than 0.8. The surface of the coil carrier opposite the surface of the sample carrier should also have a very low emissivity, that is to say, a high reflectivity, for thermal radiation; this can be achieved with an appropriately thin, electrically insulating coating of the surface. In the case of a bright metallisation, a material with low electrical conductivity such as titanium, titanium nitride, titanium aluminium nitrides, or similar metal nitrides, is preferred, which has a layer thickness that is far less than the skin effect penetration depth of the coating material so as to avoid eddy current losses. To reduce these losses, the surface is preferably not coated continuously, but provided with insulating interruptions, so that local sectors with a low eddy current resistance are created. Otherwise, an induced current flow is disadvantageously created, which weakens the magnetic flux to the sample carrier, and leads to heating of the coil carrier, and thus, in the worst case, reduces the permeability of the core material. The product of the emissivities of opposing surfaces should preferably be less than 0.1.

In an advantageous embodiment, the sample carrier core material is given a temperature-stable surface coating, so as to protect against corrosion and abrasion; this is preferably a thin glaze, or a silicate or ceramic layer. The coating should not noticeably increase the thermal capacity. A thin complete surface coating of the sample carrier is also preferred, with a metal such as nickel. The surface coating is preferably also a very thin metallic coating with low permeability that has very good heat-reflecting properties in the magnetic field transition zone, for example, titanium nitride. If the metallic coating has a lower resistivity than the core material, as in the case of gold, it should be very thin, since otherwise the ohmic dissipation of the sample carrier decreases.

In an advantageous embodiment, the sample carrier is embodied as a disc, tube, or pin. The different forms of embodiment of the desorber and the sample carrier enable the sample carrier to be designed as a disc, tube, or pin, to suit the respective application. Since the substance is acquired over the surface of the sample carrier, the size of the latter determines the acquisition capacity, so that a minimum surface area is required. At the same time, the aim is to keep the thickness of the sample carrier as low as possible. For example, for a round iron platelet, where iron has a specific thermal capacity of 449 J/(kg K) and a density of 7874 kg/m$^3$, with a radius of 1 cm and a thickness of 100 μm, a thermal capacity in accordance with $C=c*\rho*V$ with a volume $V=\pi*r^2*h$ of about 0.11 J/K can be achieved. In the preferred inventive embodiment the sample carrier is thus characterized by a low mass or thermal capacity, particularly preferably less than 10 J/K, wherein in addition a temperature regulation for high temperatures, in particular above 250° C., that is characterized by a small time offset, is possible. The sample carrier preferably has a low thickness and thus a reduced thermal capacity and yet a suitable sample contact surface, which enables the acquisition of small traces of the substances through contact. The different forms of construction of the sample carrier are intended to allow ease of manipulation for sample collection in terms of pressing, wiping, dabbing, scooping, rolling (using a rolling device), cutting, or piercing. In the disc-shaped form of embodiment, the sample can actively reach the sample carrier by surface contact with a substance-containing surface, for example by means of wiping. Alternatively, the sample can be passively applied to the surface of the sample carrier by means of a brush or cloth, or can be dissolved or suspended in a fluid or paste.

Provision is advantageously made that, in order to achieve a low skin effect penetration depth, the frequency of the alternating current is 25 kHz to 500 kHz, wherein the upper limit is technologically conditioned in particular by the generation of these frequencies at high current strengths and low power dissipations of the oscillation generator. Since the power dissipation and thus the heating of the sample carrier surface increases in proportion with the frequency over a wide range, a high-frequency alternating current is preferred for purposes of controlling the coil. This is also the case, in particular, because in this manner the layer thickness of the sample carrier can be reduced. At high frequencies, heating occurs as a result of the skin effect in a thin layer close to the surface. The inventive desorber uses the skin effect as an efficient mode of heating. The penetration of the alternating magnetic field into metals is dampened with depth, and is described by the so-called penetration depth of the magnetic field into the material as a frequency- and material-dependent parameter. Here this takes the form of a characteristic penetration depth δ, at which the current density in the conductor is reduced by the factor $e^{-1}$. The penetration depth is calculated from $\delta=1/\sqrt{(\pi*f*\mu0*\mu r*\sigma)}$, where f is the frequency, μ0 the magnetic field constant, μr is the relative permeability, and σ is the electrical conductivity. The behaviour can be fully explained by Maxwell's equations. The reciprocal penetration depth is proportional to the square root of the product of frequency, electrical conductivity, and relative permeability. With increasing frequencies, the magnetic flux thus concentrates on the surface of the sample carrier. The penetration depth characterizes the region that contributes significantly to the heat loss P, but this is not a fixed boundary, since deeper layers also contribute a useful proportion to the latter. With increasing layer thickness, however, the volume or mass and thus the thermal capacity of the source increases, as a result of which its heating time is increased. The upper frequency is limited by the material properties of the coil carrier, the construction of the coil, and the limitations of control electronics. Any coatings that are used are also taken into account in the selection of a suitable frequency.

The ratio of the sample carrier layer thickness D to the penetration depth δ is preferably greater than 2 and less than 10. The power dissipation can be increased with increasing layer thickness, but this also increases the thermal capacity. Depending on whether a very short heating time or a higher power dissipation is desired, the layer thickness D of the sample carrier can vary. It should preferably be twice as large as the penetration depth δ. However, by virtue of the exponential decay of the magnetic flux density, a layer thickness should be less than ten times the penetration depth δ.

Another alternative embodiment of the invention provides for the coil to be arranged outside the desorber housing. Here the arrangements are based on annular geometries of the coil carrier, on which the coil is mounted. The coil preferably takes the form of an annular or toroidal coil. In an exemplary manner, a part of a coil carrier is arranged along the central axis of an opening of the coil, which, in accordance with this embodiment, is implemented as a toroidal core. In this case, the coil carrier has two legs, between which a narrow gap is formed for the exit of the magnetic field lines, and in which a disc-shaped sample carrier is arranged. Furthermore, in this embodiment the coil carrier comprises a collar-shaped component for the propagation of the magnetic flux, which component is arranged inside the desorber housing.

The invention further relates to an ion mobility spectrometer for purposes of determining an ion mobility of a sample, which spectrometer comprises a cylindrical drift chamber, designed for the transport of ions from a grid switch to an ion detector against an axial drift gas flow, and a cylindrical reaction chamber adjacent to the drift chamber in the axial direction, and has a sample gas inlet adjacent to the grid switch for the introduction of a sample gas. In addition, the ion mobility spectrometer comprises a gas outlet opposite the grid switch for the discharge of drift gas and sample gas, an ionization source arranged at the gas outlet, and a desorber in accordance with the present invention.

The inventive method for the provision of a regulated voltage basically comprises the following steps:
introduction of the sample carrier loaded with a substance via the closable opening into the desorber;
inductive heating of the sample carrier by means of a high-frequency alternating magnetic field, generated by an alternating current flowing in the coil;
supply of the desorbed sample by means of the flow (preferably also by means of convection) of a sample carrier gas flow, which is supplied to the desorber via the supply lines and guided over the sample carrier, directly via the discharge lines, or indirectly via a sample gas exchanger (membrane, pinhole inlet), into the reaction chamber of the ion mobility spectrometer, in which the desorbed sample is ionized by means of an ionization source and the ionized sample gas passes through a drift field from a reaction chamber into a drift chamber, wherein it is modulated by a grid switch for detection, and the ion current is measured with an ion detector, and the resulting signal is evaluated.

The inductive heating of the sample carrier preferably takes place in a regulated manner, and can take place either rapidly in a short period of time, in steps, or in accordance with a predefined timewise profile, up to a final temperature, by way of an electronic control and regulation unit.

The desorber preferably also comprises a sensor system, such that in the course of the method a sample carrier is detected in the desorber, and the desorption process is started by a control system connected to the sensor system, if the sensor system detects the presence of the sample carrier in the interior of the desorber.

In a preferred form of embodiment of the method, the substances on the sample carrier in the desorber are captured by a supplied sample carrier gas flow, and are guided directly into an ion mobility spectrometer for analysis. In accordance with a further preferred form of embodiment, the substances can be guided via a switchable valve for analysis as a function of the desorption temperature as before, or can be diverted into a filtration or purification system.

In general terms it is known that various heat transport processes reduce the energetic efficiency of the heat source. By means of the flow over the sample carrier, the sample there captured. together with the sample carrier gas flow, reaches the reaction chamber of the ion mobility spectrometer, where it is ionized with an ionization source and the resulting ions are differentiated in accordance with ion mobility via a drift time measurement in the drift chamber. For this purpose, only a minimal sample carrier gas flow into the reaction chamber of the ion mobility spectrometer is necessary, advantageously with a flow rate of the order of, for example, 1 l/h to 10 l/h. It has been shown that this flow rate causes only insignificant heat transport and thus heat loss, compared to other heat transport processes.

Further preferred configurations of the invention ensue from the other features cited in the subsidiary claims.

The various forms of embodiment of the invention cited in this application can advantageously be combined with each other, unless otherwise stated in the individual case.

BRIEF DESCRIPTION OF THE DRAWINGS

In what follows the invention is explained in terms of examples of embodiment, with references to the accompanying figures. Here:

FIGS. 5a-5f show different forms of embodiment of a disc-shaped sample carrier;

DETAILED DESCRIPTION OF THE INVENTION

Figure 1:
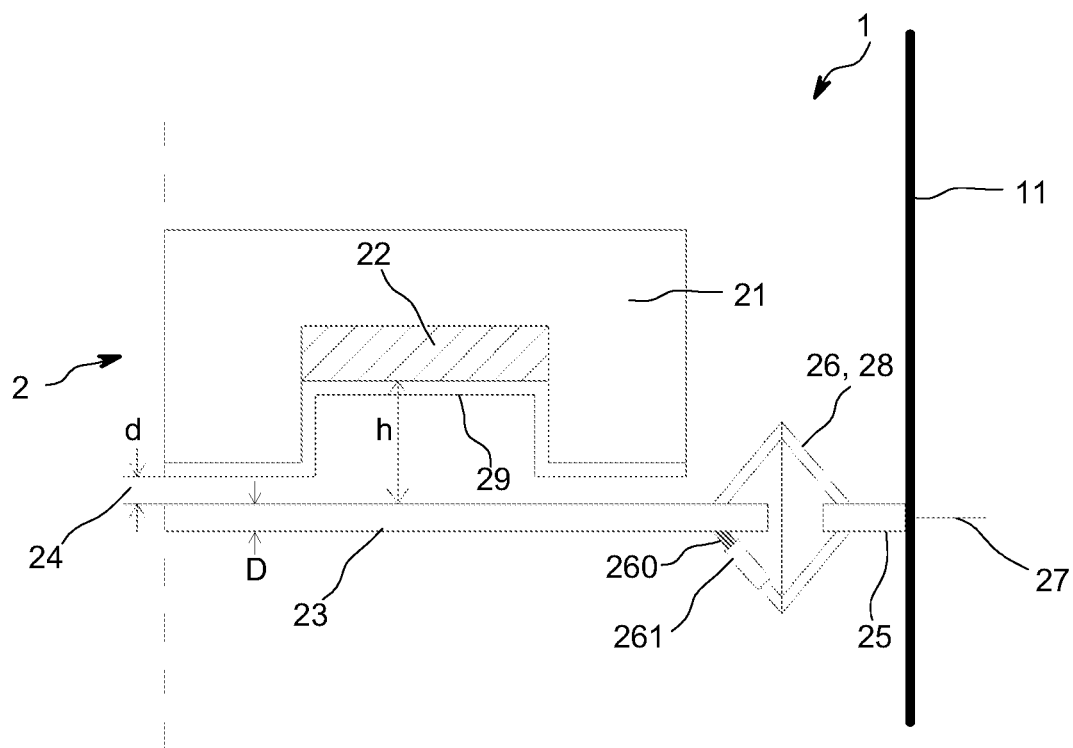
FIG. 1 shows a cross-sectional drawing of a first inventive embodiment of the desorber. with a flat sample carrier, and a coil on one side.

FIG. 1 shows a cross-sectional view of a first inventive embodiment of the desorber 1, with a flat sample carrier 23, and a coil 22 on one side. Only a detail of an entire induction unit 2 is shown, bounded by the axis of rotation, illustrated as a dashed line. The arrangement is such that the coil carrier 21 and the sample carrier 23 are located directly opposite each other. The coil carrier 21 and the sample carrier 23 are spaced apart by a narrow gap 24. The width d of the gap 24 is defined by the attachment of the coil carrier 21, and the attachment of a spacer 25. The spacer 25 is attached to a wall 11 of the desorber housing, which is not illustrated in any further detail in the figures. In the present case, the width d of the gap 24 can optionally be changed by fixing the sample carrier 23 by way of the poorly heat-conducting spacer 25, or by changing the position of the coil carrier 21 relative to the spacer 25. Furthermore, in accordance with the embodiment illustrated, the induction unit 2 comprises a coating 29, which is arranged on the surface of the coil 22 facing towards the sample carrier 23, and on the surface of the coil carrier 21 facing towards the sample carrier 23, in particular in the region of the gap 24, which is located in the magnetic field transition zone. To ensure a sufficient distance h between the sample carrier 23 and the coil 22, the sample carrier has a recess, within which the coil is mounted. This reduces the heat loss from the hot sample carrier 23 to the coil. The coil 23 is thus recessed in the tub-shaped coil carrier.

The sample carrier 23 can be removed from the desorber 1 for purposes of acquiring the sample, that is to say, transferring the sample onto the sample carrier 23. For this purpose, the sample carrier 23 is inserted into a holding device of the sample carrier holder 26, for example, a grip, and in the present case is clamped in a clip 28. Since the sample carrier 23 has a high permeability, the spacer 25 can also be a magnetic device. This can take the form of permanent magnets or, preferably, electromagnets operated by direct current, wherein the sample carrier 23 is fixed by switching the device on, and is released by switching it off.

In another form of embodiment (not illustrated), the sample carrier 23 is fixed by means of a spacer 25 with a clamp, and is secured against slippage by a small number of other sample carrier holders 26, which are in tangential contact. A preferred form of fixing is by means of short finger-shaped, sprung metallic claws, which make contact with the sample carrier 23 in a selective clamping manner. A spike-shaped pin, which also makes contact with the sample carrier 23 only at certain points, stops the latter from being inserted too deeply. For purposes of stabilization, the sample carrier 23 can preferably be fixed on both sides with particularly poorly heat-conducting platelets, which are, for example, made of mica such as phlogopite, and are attached to the spacer 25. A notched mica platelet is preferably also used, which is clamped in a cylindrical spacer 25 such that the sample carrier 23 only makes contact with the thin side faces of the platelets.

A temperature sensor 261 is located on the sample carrier 26; it is connected to the sample carrier 23 via a thermal bridge 260.

The sample carrier 23 preferably has an axially-symmetrical shape. The shapes of the coil carrier 21 and the coil 22 are adapted accordingly. The usual pan-shaped embodiments are well suited, but in their standard forms offer limited volume for the accommodation of a coil 22 with an increased number of turns. Based on this shape, a deeper tub is more beneficial. Disc-shaped, or cylindrical, or hollow-cylindrical, embodiments are preferred. With these, axially-symmetrical magnetic fluxes can be generated via adapted coil carriers 21, and the desired electrical eddy currents can be generated in the sample carrier 23.

Another preferred form of embodiment (not illustrated) relates to a rapid sequential desorption by means of at least two sample carriers 23, which are located in a heat-insulating holder, divided in accordance with the number of possible sample carriers 23, and are supported in each sector of the holder by way of a small number of support pins. These are introduced into the induction unit 2 one after another by way of a conveyor mechanism, into the desorber 1 and into the preferred position. The desorber 1 has two opposing slots for this purpose. The sample carrier sectors are designed in such a way that they form an insulating frame around the sample carrier 23, which, when inserted in the desorber 1, closes the latter in a sealing manner. The mode of operation is similar to that of a scanner for film strips.

In the case of parallel operation, the entire holder with the sample carriers 23 enters a desorber 1 that is preferred for this mode of operation, and is characterized in that a similar, independently activatable, induction unit is assigned opposite each individual, indexed sample carrier 23. The sample carrier gas flow flows around all the sample carriers 23 in the same manner. Desorption from the sample carriers 23 takes place individually, and the desorbed substance thus reaches the inlet of the ion mobility spectrometer. After desorption, rapid cooling of the individual sample carrier 23 takes place, in order that the next one can be activated. Advantageously, such a sequential parallel operation (in comparison to a simultaneous parallel operation) does not require parallel gas outlets or evaluation units.

Figure 2:
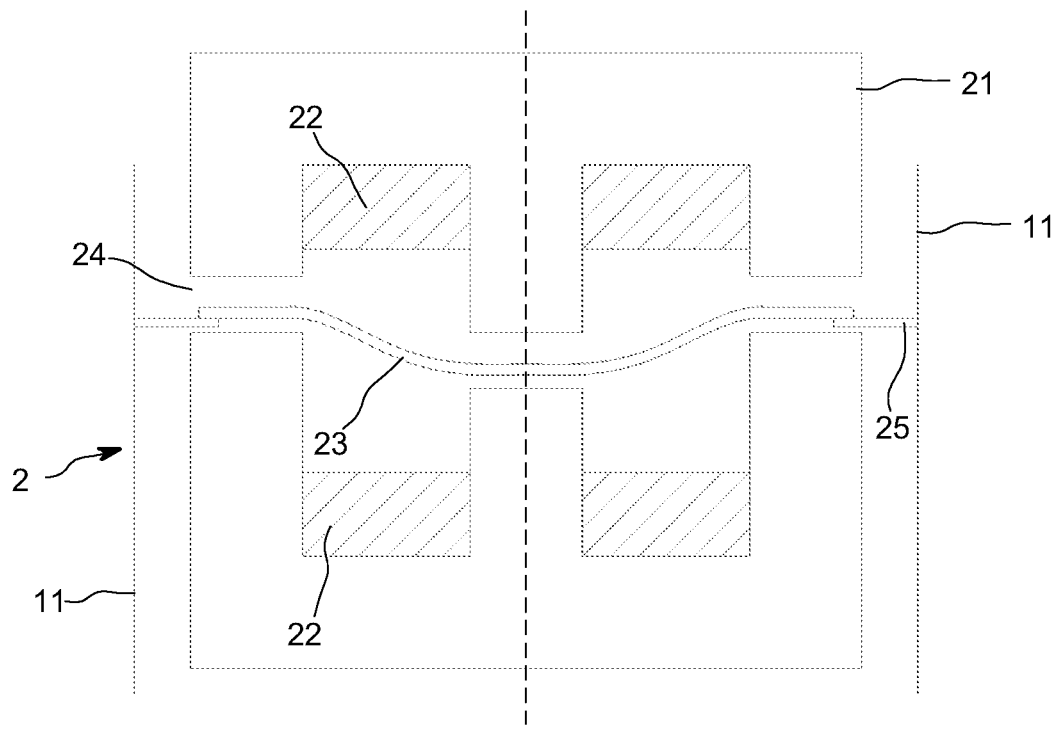
FIG. 2 shows a cross-sectional drawing of a second inventive embodiment of the desorber. with a flat sample carrier with a plate-shaped recess, and a coil on both sides.

FIG. 2 shows a cross-sectional drawing of a second inventive embodiment of the entire induction unit 2 of the desorber 1, with a flat sample carrier 23, with a plate-shaped recess and coils 22 on both sides, wherein the axis of rotation is again illustrated in the form of a dashed line. Here too, each coil 22 is mounted in a recess on one side, and circulates about an inner cylinder of the coil carrier 21. In this manner the power dissipation achieved is increased. In addition, the radiation from the gap 24 can be compensated for by the counter-rotation of the individual magnetic fields. To remove the sample carrier 23, the upper coil carrier 21, together with the coil 22, can be moved vertically.

Figure 3:
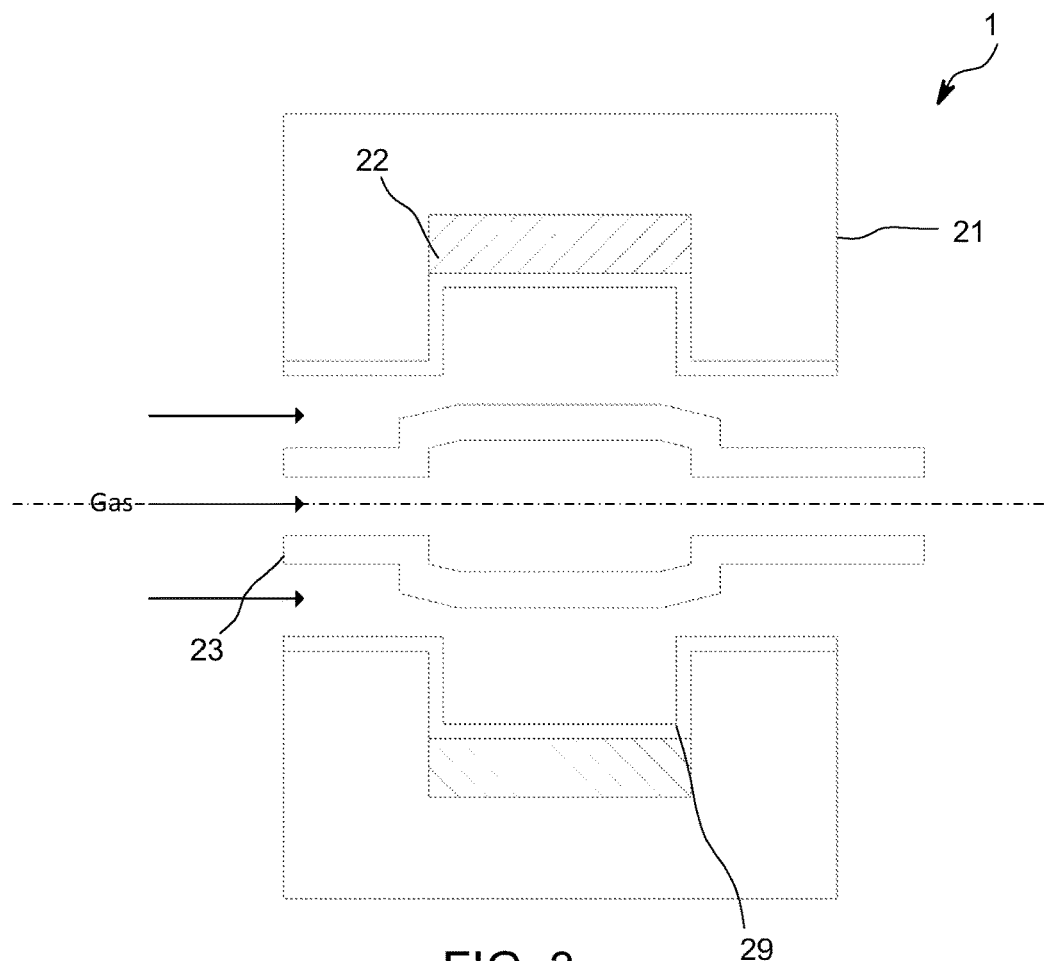
FIG. 3 shows a cross-sectional drawing of a third inventive embodiment of the desorber. with a cylindrical sample carrier, and a circumferential coil.

FIG. 3 shows a cross-sectional drawing of a third inventive embodiment of the desorber 1, with a cylindrical sample carrier 23 and a circumferential coil 22. The coil can, for example, be a cylindrical coil, which has a toroidal shape. The coil 22 has a cylindrical opening along its central axis, which is illustrated in FIG. 3 as a dotted-dashed line, within which the sample carrier 23 is arranged such that the coil 22 circulates about the sample carrier 23. The sample carrier 23 is a hollow cylinder, which on its outer surface has a rolling surface, that is to say, a wiping surface, in the form of a local elevation. For sampling purposes, the sample carrier 23 can be placed on a roller, for example. If a sample is to be taken by piercing, it is recommended that a cylindrical sample carrier 23 without elevations be used.

Figure 4:
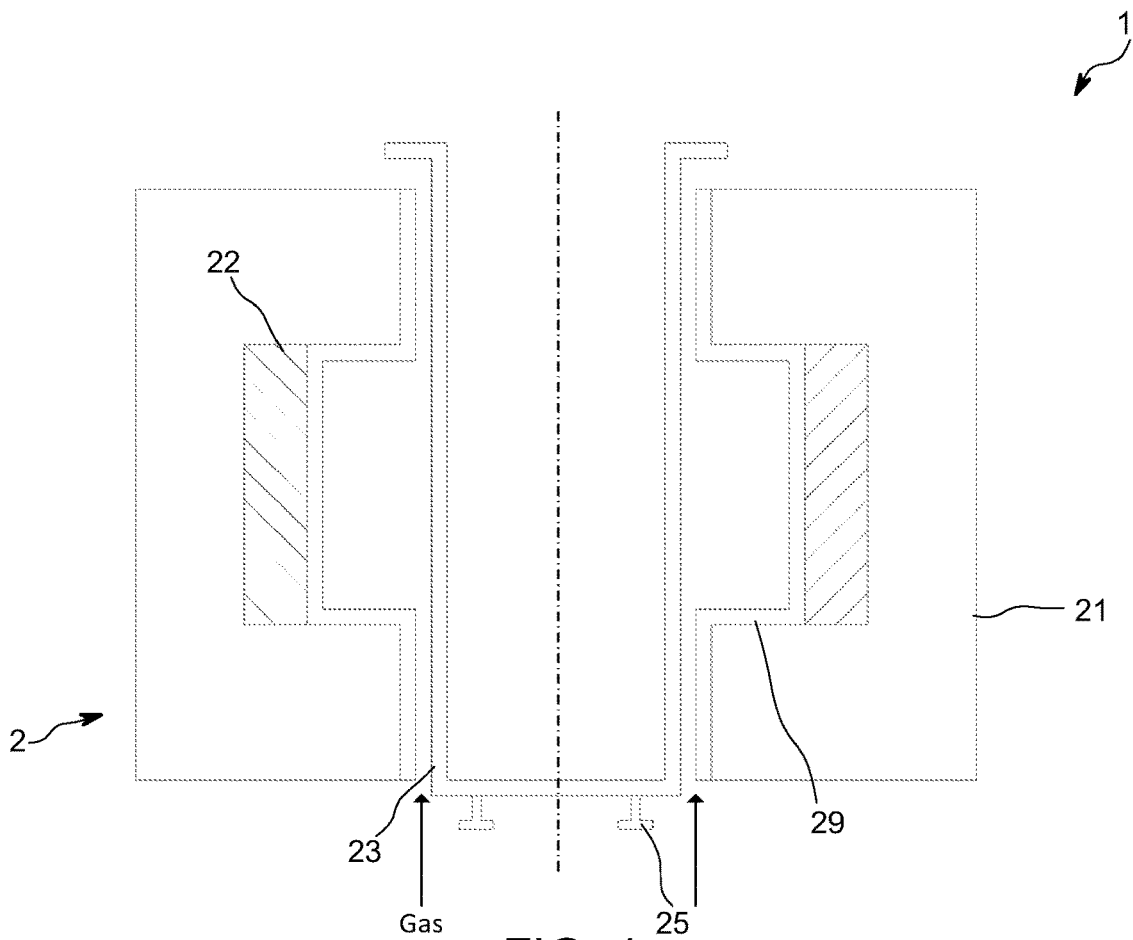
FIG. 4 shows a cross-sectional drawing of a fourth inventive embodiment of the desorber. with a cylindrical sample carrier in the form of a tub, and a circumferential coil in a vertical orientation.

FIG. 4 illustrates a cross-sectional drawing of a fourth inventive embodiment of the desorber 1, with a cylindrical sample carrier 23 and a circumferential coil 22 in a vertical embodiment. An annular or toroidally-shaped coil 22, with a preferably rectangular cross-section, is inserted in the coil carrier. Along the illustrated dashed line of the central axis of the coil 22, a cylindrical opening is thus created, in which the cylindrical sample carrier 23 is arranged. The coil 22 surrounds the sample carrier 23, in the manner of a traditional coil with a core. The induced current flow is at right angles to the magnetic flux in the surface layer of the sample carrier 23 over its outer circumference. The sample carrier can be formed by cylindrical geometries such as (thin-walled) cylinders with and without a floor, pins or spikes. In the present case, the sample carrier is a thin-walled cylinder with a floor.

FIGS. 5a-5f illustrate various forms of embodiment of a disc-shaped sample carrier 23. FIG. 5a shows a sample carrier 23, which has an annular well in the sample contact zone (region II, see the following description) for the improved acquisition of a substance to be detected. In the magnetic field transition region (region I, see the following description), the sample carrier is still embodied in a flat manner. An alternative in the form of a number of circular wells is illustrated in FIG. 5c. A further possibility for purposes of improving the substance acquisition is provided by grid-like textures, as illustrated in FIG. 5d. In accordance with the embodiment in FIG. 5b, the sample carrier 23 has small, pore- or slit-shaped openings that are distributed over the sample collection zone, and are rectangular in shape, for purposes of improving substance transport by means of the sample carrier gas. In order to improve the sample receptivity for the fluids that are to be evaporated, the axially-symmetrical sample carrier 23, with a dashed line illustrating the axis of rotation has as preferred structural features, in accordance with the embodiment shown in FIG. 5e, narrow, somewhat raised edges around the sample contact zone, which can be formed from the sample carrier material as a barrier or collar, etc., so that pan-shaped acquisition surfaces are created. This corresponds essentially to the sample carrier 23 with an annular well illustrated in FIG. 5a. In the case of an arrangement with a double-sided coil 22, these raised edges can also be embodied on both sides of the sample carrier, as illustrated in FIG. 5f.

Figure 6:
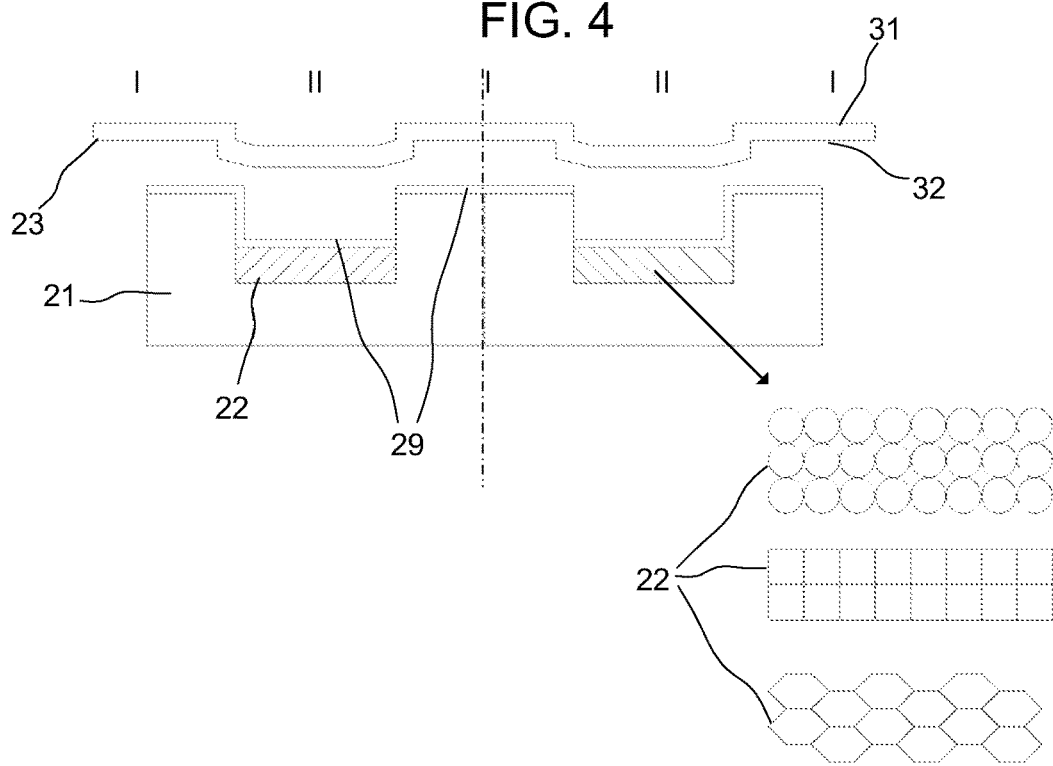
FIG. 6 shows a cross-sectional drawing of a fifth inventive embodiment of the desorber, with a flat sample carrier with a circumferential recess and a coil on one side, and various embodiments of the coil winding.

FIG. 6 shows a cross-sectional drawing of a fifth inventive embodiment of the desorber 1, with a flat sample carrier 23 with a circumferential recess about the axis of rotation, which is illustrated as a dashed line, and with a coil 22 on one side. The sample carrier 23 is advantageously divided into at least two types of zones: the magnetic field transition zone I and the sample contact zone II. The magnetic field transition region I concerns the transition region of the magnetic flux into the sample carrier 23; the sample contact zone II primarily serves to acquire or deposit the sample. The individual zones are functionally coated in accordance with the task. The functional layers can even be configured in a different manner on the lower and upper sides of the sample carrier 23. For a single-sided disc-shaped coil arrangement, the side of the sample carrier 23 facing away from the magnetic field can be used entirely for the desorption task, and can receive an enamel or nickel layer 31 (coating A). The gas layer adjacent to the latter should be quite thick, for example 5 mm, to avoid heat conduction losses. The wall of the desorber housing opposite the sample carrier side 23 also receives a highly heat-reflecting coating (not illustrated), so that the heat losses on this side are very low. In accordance with this embodiment, a titanium nitride coating 32 (coating B) is arranged on the side of the sample carrier 23 facing towards the coil arrangement. Furthermore, the construction of the coil 22 is shown schematically. This can consist of multi-core stranded wire, which has different cross-sectional areas. One possibility is a circular cross-sectional area, wherein, however, a stranded wire built up from square or hexagonal stranded wires, with individual wires insulated from one another, is preferred. This enables a high fill factor to be achieved.

Figure 10:
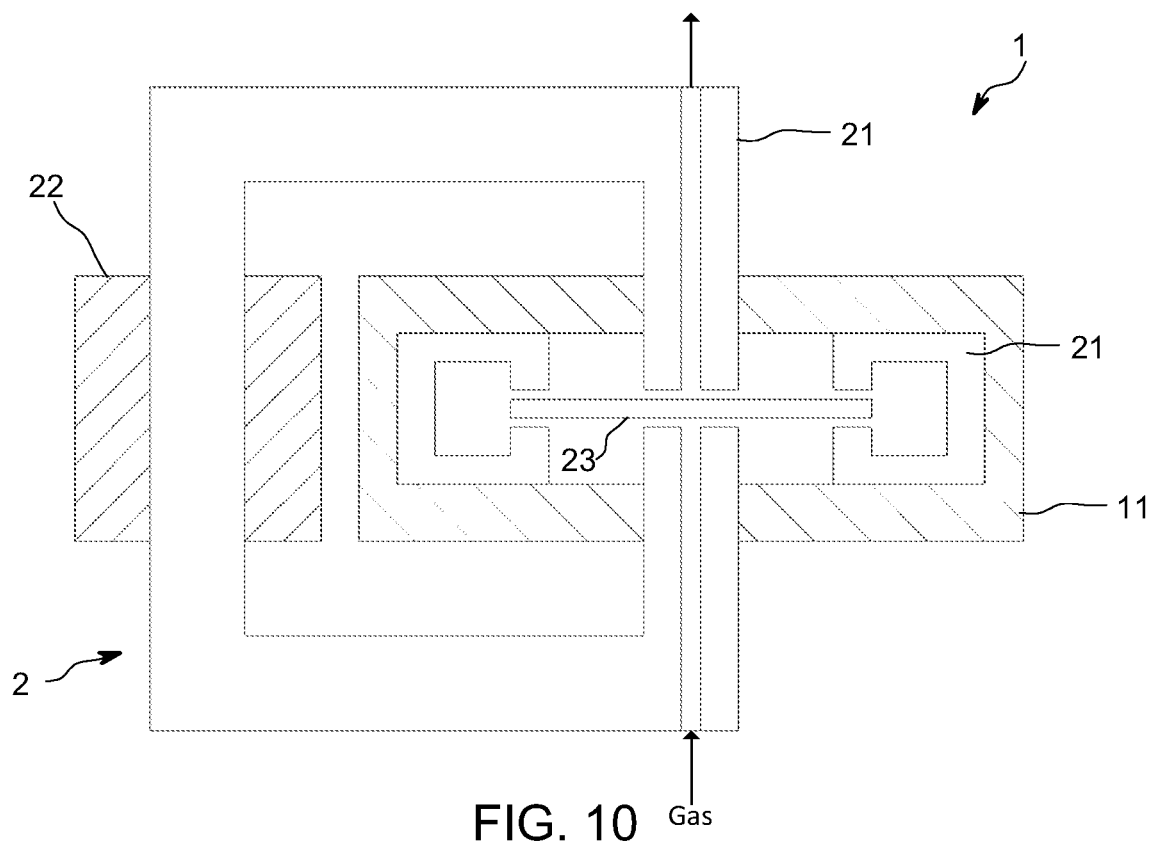
FIGS. 10 and 11 show alternative embodiments of a desorber in accordance with the invention.
Figure 11:
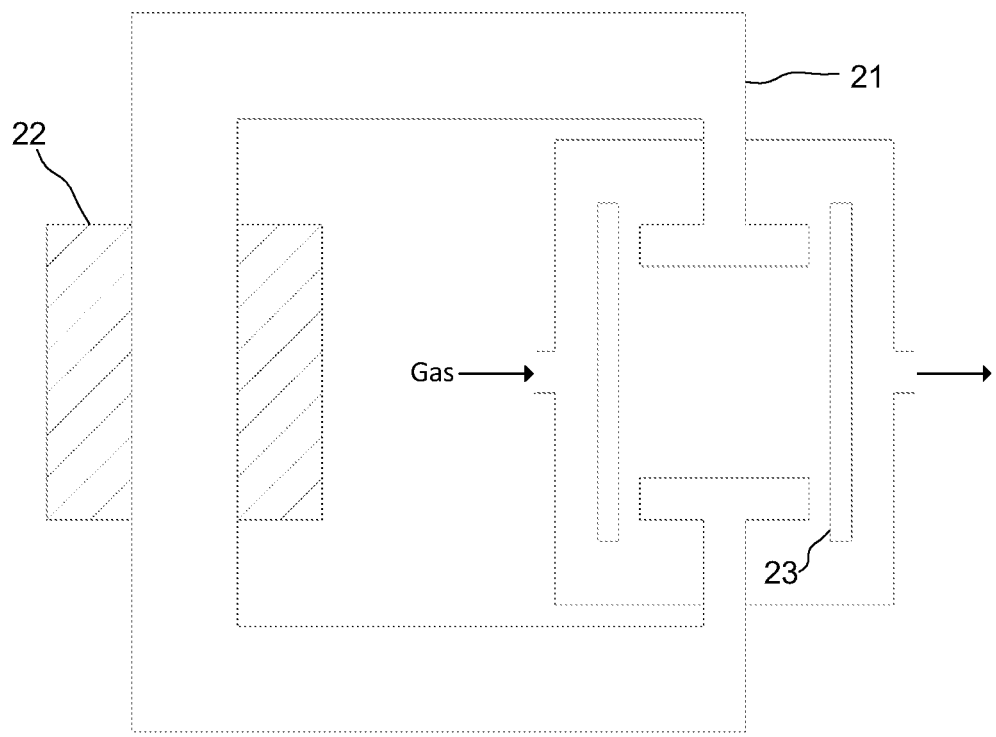

First and second alternative embodiments of an inventive desorber are illustrated in FIGS. 10 and 11. Here the significant difference from the other examples of embodiment described is that the coil 22 is arranged outside the desorber housing 11. In contrast to the pan-shaped geometries previously used, the arrangements are based on annular geometries of the coil carrier 21, on which the coil 22 is mounted, for example, an annular or toroidal coil 22. In FIGS. 10 and 11, only the relative arrangement of the coil carrier 21, coil 22 and sample carrier 23, and of the desorber housing 11, is illustrated. In FIG. 10, along the central axis of an opening of the coil 22, a part of a coil carrier 21 is arranged, which in this embodiment is implemented as a toroidal core. The coil carrier 21 has two legs, between which a narrow gap is designed for the exit of the magnetic field lines, and in which the disc-shaped sample carrier 23 is arranged. Furthermore, the coil carrier 21 comprises a collar-shaped component as an extension, which is arranged inside the desorber housing 11. In FIG. 11, a toroidal core is also used as a coil carrier 21, with a corresponding coil 22, which is also mounted outside the desorber housing 11. Furthermore, in accordance with FIG. 11, a cylindrical sample carrier 23 serves to acquire a sample.

Figure 9:
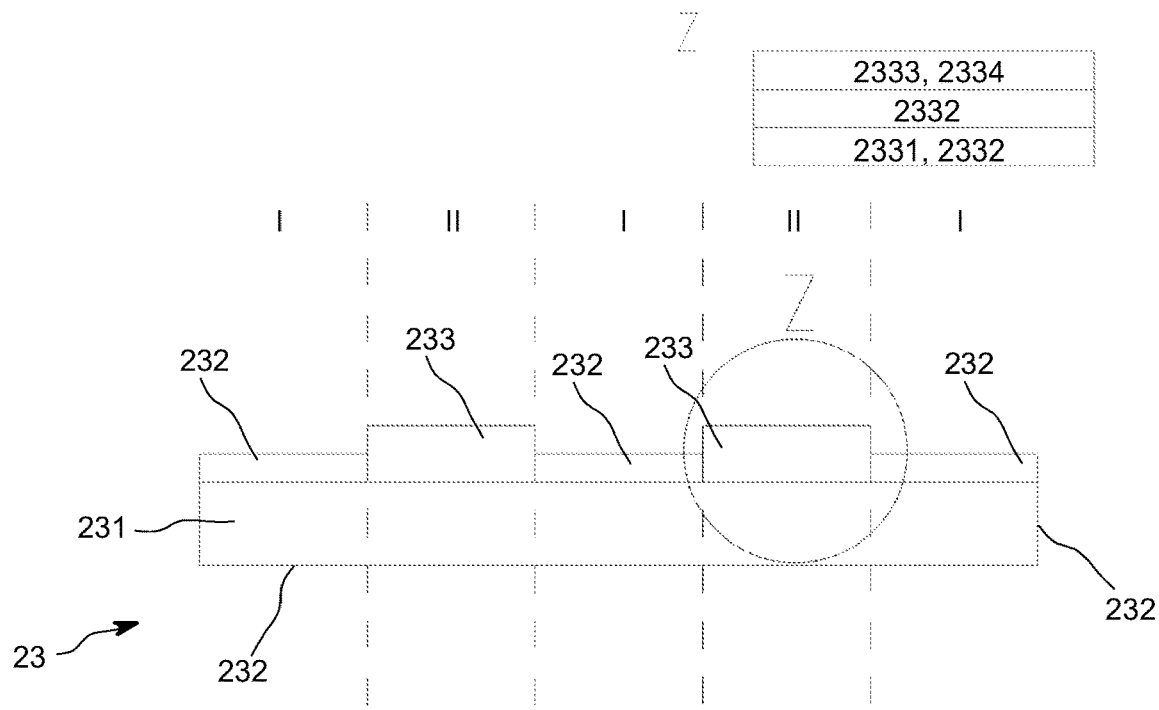
FIG. 9 shows a layered structure of a sample carrier of a desorber in accordance with the invention.
Figure 8:
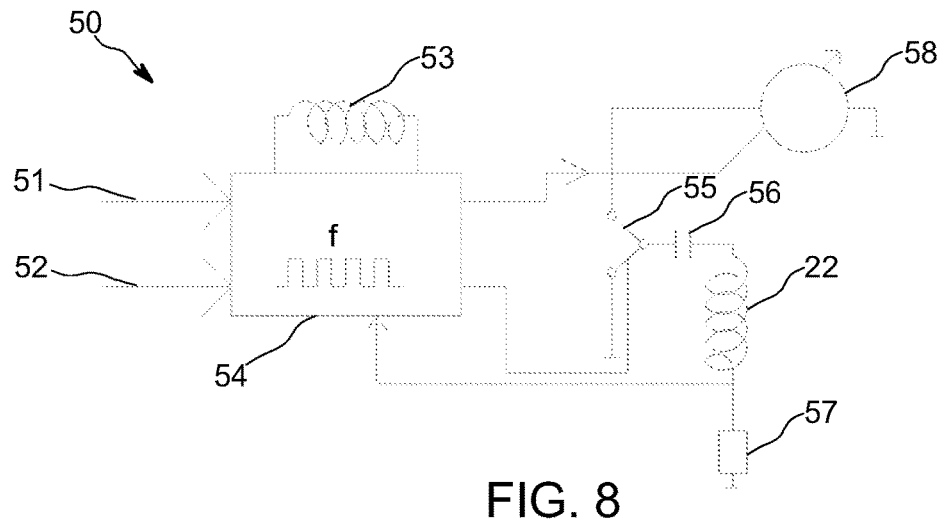
FIG. 8 shows an electronic control and regulation unit for purposes of controlling a desorber in accordance with the invention.

FIG. 9 illustrates the structure of a sample carrier 23 in accordance with the invention, and alternatives for suitable coatings of the sample carrier. The sample carrier 23 basically comprises a core 231, which consists of a high-permeability material that also has a high electrical conductivity. In accordance with this embodiment, the sample carrier is embodied as a disc, which is active on one side, in other words it is covered on one side only by an arrangement (not illustrated) of coil carrier 21 and coil 22. Furthermore, the active side of the sample carrier 23 can be divided into the magnetic field transition region I, a region inactive for the sample, and a sample contact zone II, a region active for the sample. Within region I, the magnetic field is coupled into the sample carrier 23. In regions I and II the core is coated with different coatings. Region I comprises a coating 232 arranged on the core 231, which has a high reflectance for thermal radiation. The coating 232 can take the form of an inert layer, for example of glass or enamel, or of a high-reflectance, or low-emissivity, reflective layer, for example of titanium nitride or another metal nitride. The coating 232 is preferably also arranged on the region not covered by the coil carrier 21 and coil 22 on the opposite side of the sample carrier 23, and also on its lateral end surfaces, as is also indicated in FIG. 9. Region II comprises a sample carrier layer 233, which in turn may be constructed from a plurality of layers. This is shown schematically in the enlarged detail Z of the coating. Adjacent to the core, within the sample carrier layer 233, is arranged a coating 2331 for purposes of mechanical structuring, or a resistive layer 2332 with a higher resistivity. The latter can also be added to a coating 2331 subsequently, as FIG. 8 shows. The final layer can be formed as a catalytic layer 2333 or as an inert layer 2334. The layers 2333 and 2334 are basically introduced on the surface.

Figure 7:
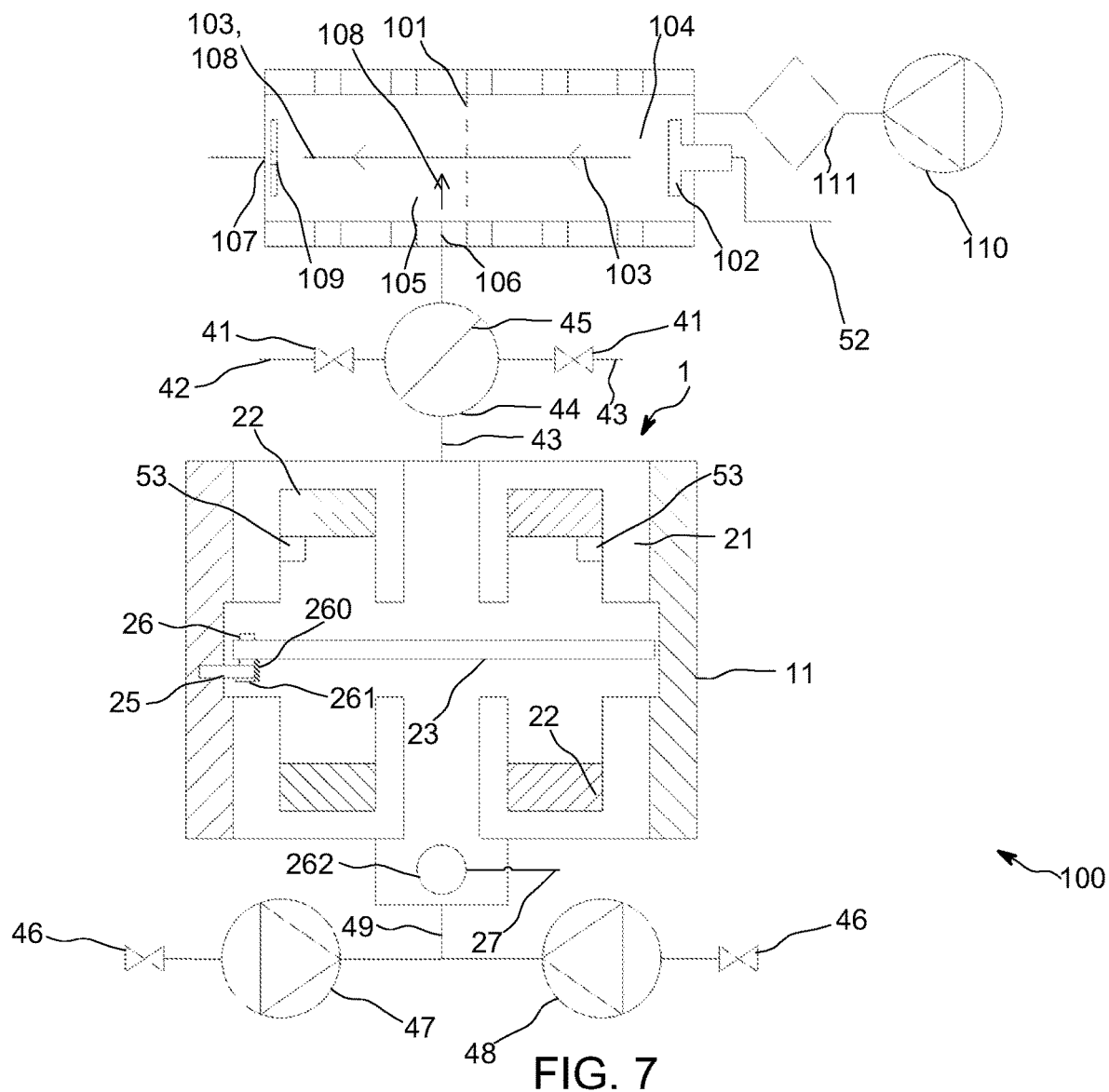
FIG. 7 shows a schematic structure of an ion mobility spectrometer in accordance with the invention. with an inventive embodiment of the desorber.

FIG. 7 shows a schematic structure of an inventive ion mobility spectrometer 100 with an inventive embodiment of the desorber 1. The ion mobility spectrometer 100 has a cylindrical drift chamber 104 and a cylindrical reaction chamber 105 adjoining it in the axial direction. The drift chamber 104 is bounded on one side facing towards the reaction chamber 105 by a grid switch 101. On a side opposite the grid switch 101, the drift chamber 104 is bounded by an ion detector 102, and the reaction chamber 105 is bounded by a gas outlet 107. A drift gas inlet is arranged in the immediate vicinity of the ion detector 102. A sample gas inlet of the spectrometer 106 is arranged in the reaction chamber 105 adjacent to the grid switch 101.

Furthermore, an ionization source 109 is arranged in the reaction chamber 105 close to the gas outlet 107.

In the course of operation of the ion mobility spectrometer 100, a drift gas 103 is introduced, by means of a drift gas pump 110, through the drift gas inlet, at a defined flow rate, into the drift chamber 104. The drift gas 103 has previously passed through a dry gas filter. The drift gas 103 flows through the drift chamber 103, the grid switch 101, and the reaction chamber 105, and leaves the ion mobility spectrometer 100 through the gas outlet 107. Furthermore, in the course of operation of the ion mobility spectrometer 100, a sample gas 108, consisting of sample material contained in a carrier gas, can be introduced into the reaction chamber 105 through a sample gas inlet 106. The sample gas 108 mixes with the drift gas flow 103 in an axial direction downstream of the sample gas inlet 106, and the total gas flow, comprising the sample gas flow 108 and the drift gas flow 103, flows towards the gas outlet 107. Before the total gas flow leaves the ion mobility spectrometer 100 through the gas outlet 107, it passes through an ionization source 109.

On the ionization source 109, the sample material is ionized by a radioactive source, X-ray- or UV-radiation, or locally by a dielectric barrier discharge. By means of an electric field, the ions are "pulled" through in the direction of the ion detector 102, and reach a drift speed that is characteristic for them, with which they finally move to the ion detector, which receives them.

The ion mobility spectrometer 100 further comprises a desorber 1. This can take the form of an embodiment in accordance with one of the desorbers previously described, but can also take the form of any other embodiment in accordance with the present invention. Schematically illustrated in this case is a desorber 1 with an opening (hole core) located in the coil carrier, and a circumferential coil 22 on both sides, together with a disc-shaped sample carrier 23.

To control the temperature of the sample carrier 23, it is expedient to connect it to a temperature sensor (for example, a platinum resistor, or a thermocouple) with a very low thermal capacity, in order to control the operating parameters of the coil 22. The temperature sensor 261 is preferably connected to a small surface via an existing sample carrier holder 26, which in particular comprises a clamp 28. The measured values are transmitted in analogue or digital form to the electronic control unit 50 shown in FIG. 8, by means of the signal line 27. The electronic control and regulation unit 50 then monitors the target temperature, for example, for the time-controlled setting of a temperature profile. The temperature on the surface, which due to the high thermal conductivity corresponds to the core temperature of the sample carrier 23, can preferably also be determined by measuring the thermal radiation from the sample carrier 23 by means of a pyroelectric sensor 262, which is arranged, for example, via a hole through the coil carrier 21, as shown in FIG. 7, or via a window on the desorber housing. However, since the sample carrier 23 preferably has a very low emissivity, it preferably has a very small-surface, lossy, marking with a significantly higher emissivity, for example, with a value of almost 1. An optical system focusing on this marking images the radiation onto the pyroelectric sensor. Another preferred indirect optical temperature measurement can also be made through a chamber opening, for example that for the sample gas supply, by way of the colour change of an indicator layer on the sample carrier 23.

The acquisition of the sample via the sample carrier 23 prior to desorption is preferably achieved by means of light contact with the surface to be examined, as a result of which particles adhere to the sample carrier 23. Also preferred is an indirect transfer of the sample by means of auxiliary devices such as brushes, or by the pipetting of substances dissolved or suspended in fluid onto the disc-shaped or plate-shaped sample carrier 23. If the substance is caused to evaporate before introduction into, or also in, the desorber 1, it precipitates or crystallizes. Another preferred possibility of transfer is to embed the substance in a paste, which is applied thinly onto the sample carrier 23, where it dries out or hardens. During desorption, the substance diffuses out of the porous, preferably temperature-stable layer.

In the case of a purely ferrous sample carrier 23, this is particularly preferably passivated with a thin, chemically inert and heat-resistant coating to protect it from oxidation (in particular in contact with substances). In one form of embodiment, this is an electrical insulator, such as enamel, with a relative permeability of about 1, and does not influence the magnetic properties of the sample carrier. In another form of embodiment, the coating consists of a thin protective layer of nickel. This also does not have a negative effect on the magnetic properties of the sample carrier 23, as it is itself ferromagnetic at temperatures that are not too high (<Curie temperature).

Because of the heat conduction and radiation losses, the magnetic field transition region should be small. This transition region is characterized by a low emissivity for thermal radiation, on both the coil side, and the sample carrier side (no substance-acquiring surface). In particular, on the sample carrier side this is preferably already achieved by polishing, in the case of metallic surface coatings.

In order to prevent outgassing of the coil 22 into the gas volume, and, on the other hand, to prevent sample components in the gas from being deposited in the coil 22, the latter is separated from the gas volume by a coating 29. On the side of the heat-insulating gas layer in contact with the sample carrier 23, the surface of the coating 29 is preferably provided with a heat-reflecting layer.

The geometric shape of the interior of the housing, including coil carrier 21, coil 22, gap 24 and sample carrier 23, determines the total inductance, and thus the resonant frequency. It is altered if the sample carrier 23 is removed. This is associated with an alteration in current intensity, that is to say, an alteration in power. This fact can advantageously be exploited to start the desorption process with the aid of the electronic control unit 50, and to detect the removal of the sample carrier 23. Because of the very high temperatures of the sample carrier 23, a controlled safety lock or latch is preferably included for the removal of the sample carrier 23 via the closing mechanism of the desorber 1.

In the course of the method, the sample carrier 23 enters the interior of the desorber 1 through a slit-shaped closable opening (not illustrated in the disc-shaped form of embodiment), and through a circular closable opening (not illustrated in the cylindrical form of embodiment), in which it is fixed by robust spacers 25 and sample carrier holders 26 consisting of solid material. In order to minimize heat conduction losses, the total cross-section of the spacers 25 is as small as possible, and comprises a poorly heat-conducting material such as glass, ceramic or glass-ceramic. Contact with the sample carrier 23 is made at the greatest possible distance from the wall. It is a characteristic of the invention that no effective energy flow to the sample carrier 23 takes place via the spacers 25, either by external heat supply or by electric current flow.

In most applications, the gas in the desorber 1 is air, which has a high oxygen content. To avoid oxidation and any associated decomposition of the substances, in particular at higher temperatures, the interior of the desorber 1 is filled with an inert gas such as nitrogen, or with a noble gas such as argon, by means of a first sample carrier gas pump 1 47 via the sample carrier gas inlet 49. This preferably takes place before desorption at low temperature. The change of the sample carrier gas flows transported by means of pumping for the individual gases, for example between the air and the inert gas, can take place by means of the valves 46 or via a plurality of gas inlets and outlets present, and a second sample carrier gas pump 2 48 on the housing of the desorber 1. In this case, the presence of a common section of the gas outlet at the gas inlet of the ion mobility spectrometer is particularly preferred, in which a gas exchange takes place through a sample gas exchanger 44 into the reaction chamber 105 of the ion mobility spectrometer 100 across membranes 45, or via a direct inlet 45, preferably via a small opening (a pinhole) 45. After the desorption process, that is to say, after completion of the heating process, and with the start of the cooling of the sample carrier 23, the supply of the inert gas is preferably only terminated from a specified temperature, on account of any possible residual substances present, and air is again guided into the chamber of the desorber 1 by switching over the valve.

In the interior of the tightly closed desorber 1, the actual desorption process takes place, with the substance to be detected on the sample carrier 23, by the generation of the high-frequency alternating magnetic field with the aid of the current-carrying coil 22, controlled by the electronic control and regulation unit 50. A sensor coil 53 is arranged adjacent to the coil 22 in order to provide the electronic control and regulation unit 50 with information about the magnetic field of the coil 22. To prevent sample material from entering the environment during the desorption process, the housing (not illustrated) is equipped with a closing device. Through one or a plurality of gas inlets (also not illustrated), the sample carrier gas flow, preferably consisting of clean, dry gas, and transported by a pump mechanism (47, 48), enters the interior of the desorber 1, which in a manner that characterizes the invention flows almost completely around the sample carrier 23, together with the sample, and thus forms a heat-insulating jacket around the sample carrier 23. The sample carrier gas flow around the sample carrier 23 takes place with minimal flow resistance along the sample carrier 23. In the case of a disc-shaped sample carrier 23, which is located between one or two coil carriers 21 provided with a centre hole, the flow preferably takes place in an axially-symmetrical manner. As a general rule, the sample carrier gas flow is continuous and constant. For purposes of cooling the sample carrier 23 after the measurement, and for purposes of cleaning the interior of the desorber 1, the flow rate, that is to say, the volumetric flow rate, can be increased. During the desorption process, the sample carrier gas flow can be modulated. In this way, if the sample carrier gas flow is absent or reduced for a certain time, a substance enrichment can be achieved in the environment of the sample carrier 23. The increased sample carrier gas flow then transports the enriched substance into the reaction chamber of the ion mobility spectrometer.

Through preferably one, or also a plurality of, gas outlets of the desorber 1, the gas enriched with the sample enters the reaction chamber 105 of the ion mobility spectrometer 100 via the sample gas inlet 106. Alternatively, the gas enriched with the sample can be discharged into the environment, wherein the sample carrier gas flow, enriched with the substance, is preferably filtered, and/or passivated by activated carbon. This can take place by way of a parallel gas flow, which is sucked in from the environment by a pump arranged on the inlet side of the housing. After the desorption process, the sample carrier 23 can be cleaned with clean gas via this outlet, or another gas outlet, and cooled at an accelerated rate with an increased volumetric flow rate.

On account of the almost inertia-free increase in the sample carrier temperature, highly volatile substances, such as solvents or binders, which may be present in the sample as accompanying substances when the sample is acquired, can initially be separated chromatographically from the less volatile substances, such as salts, and detected in the ion mobility spectrometer or, if necessary, discharged via the switching device, for example to prevent an "overload" or overproduction of high-affinity substance ions in the reaction chamber, as a result of which the reaction chamber remains clean until the target substances or salts are detected.

Also in the case of the low-volatility salts, a further chromatographic separation can be carried out, for example, taking into account the possible decomposition temperature of the substances or salts to be expected.

The interior of the housing of the desorber 1 and the gas outlets are preferably protected with a passive layer such as Teflon or a silicate layer, so as to prevent deposits and for better cleaning. Advantageously, this layer in the desorber chamber is designed as a thin heat-reflecting insert 29 that can be removed from the chamber to avoid heavy contamination.

The aforementioned electronic control and regulation unit 50 is shown in more detail in FIG. 8. It comprises a central controller 54 which receives measurement signals in the form of a temperature signal 51 from the desorber, and optionally a detector signal 52 from the detector 102. Furthermore, the electronic control and regulation unit 50 comprises a sensor coil 53 for purposes of measuring the magnetic field of the coil 22, which is connected to the controller 54 via a signal line. Furthermore, the electronic control and regulation unit 50 comprises a changeover switch 55, which is connected to a current or voltage source 58, together with a capacitor 56 and the coil 22. A resistor 57 is used to measure the current flowing through the coil 22.

The inductive heating of the sample carrier 23 within the method is regulated and, depending on the application and the target, can take place either rapidly in a short period of time, in steps, or in accordance with a specified time profile, up to a final temperature by the control by means of the electronic control and regulation unit 50. The target temperature can be set via the frequency of the alternating current in the coil 22 and thus the effective magnetic flux can be set by means of the controller 54. However, control of the temperature by alteration of the current amplitude or the magnetic flux amplitude is preferred.

The magnetic flux is preferably additionally monitored by the introduction of at least one further coil winding into the coil carrier 21 in addition to the coil 22, so that the magnetic flux generated by the coil 22 is encircled. This takes place here by way of the sensor coil 53. An alternating current to be measured is induced in the control turn of the sensor coil 53, which, with the knowledge of the permeability of the sample carrier material, is a measure of the magnetic flux. A further preferred measurement of the magnetic flux, or a defined proportion of the latter, is carried out by Hall effect sensors, which are inserted into the magnetic flux of the coil carrier guiding the magnetic field.

For the alternating current through the coil 22, resonant generation is preferred, wherein the inductance of the magnetic system for each individual coil 22, with the participation of the sample carrier 23, determines the capacitance of the capacitor 56 in the resonance case for a selected frequency f in the range from 25 kHz to 500 kHz, for example, at 75 kHz. In the simplest case, a forced oscillation is generated in the oscillating circuit consisting of the coil 22 and capacitor 56 by way of a changeover switch 55, for example with MOSFETs with a low on-resistance in a half-bridge circuit. The coil 53 previously mentioned for purposes of measuring the magnetic flux, or other such coils, can also be used to generate a fed-back resonant oscillation. For this purpose, the current flow through the coil 22 can be controlled by an analogue control function via the controller 54.

For the detection of the desorbing substances in connection with a temperature-controlled temperature profile, it is advantageous if the enthalpy of vaporization or sublimation, and the critical transformation temperature, are assigned to each of these substances in a library or database, in accordance with which an expected maximum partial pressure can be determined. An experimentally determined optimal sample carrier temperature is preferably stored in the library or database.

Even though the invention describes numerous measures for reducing heat losses, the heat necessary for heating the sample carrier 23 must be dissipated from the desorber 1, since important system components such as the coil 22 and coil carrier 21 can only withstand a maximum operating temperature. The very good heat-insulating gas layer around the hot sample carrier 23 makes it possible to cool effectively the coil components, which have a significantly higher thermal conductivity, by means of an appropriate device such as a heat sink. The heat sink (not illustrated) preferably forms the enclosing and sealing housing and preferably comprises a thermally conductive ceramic. Since the coil carrier material is non-conductive, conventional metallic heat sinks of, for example, aluminium, are also suitable. A two-part structure of the housing, consisting of heat sink and heat-insulating housing material in the magnetic field transition region is particularly preferred for the holders of the sample carrier 23.

LIST OF REFERENCE SYMBOLS

1 Desorber
11 Desorber housing
2 Induction unit
21 Coil carrier
22 Coil
23 Sample carrier
231 Core
232 Heat reflecting/inert coating
233 Sample carrier layer
2331 Mechanical structuring layer
2332 Resistance layer
2333 Catalytic layer
2334 Inert layer
24 Gap
25 Spacer
26 Sample carrier holder
260 Thermal bridge
261 Contacting temperature sensor
262 Non-contacting temperature sensor
27 Signal line
28 Clamp
29 Coating
31 Coating A
32 Coating B
41 Throttle valve
42 Reaction chamber gas inlet
43 Sample carrier gas outlet
44 Sample gas exchanger
45 Membrane/pinhole/direct Inlet
46 Valve/shut-off valve
47 First sample carrier gas pump
48 Second sample carrier gas pump
49 Sample carrier gas inlet
50 Electronic control/regulation unit
51 Temperature signal
52 Detector signal
53 Sensor coil
54 Controller
55 Changeover switch
56 Capacitor
57 Resistor (shunt, current sensor)
58 Regulable current or voltage source
100 IMS
101 Grid switch
102 Ion detector
103 Drift gas
104 Drift chamber
105 Reaction chamber
106 Sample gas inlet of the spectrometer
107 Gas outlet
108 Sample gas
109 Ionization source
110 Drift gas pump
111 Dry filter

The invention claimed is:

1. A desorber for a spectrometer comprising a housing having supply lines and discharge lines for a sample carrier gas, a closable opening, and an induction unit arranged in the housing, wherein the induction unit comprises:
    an electrically insulating coil carrier having a relative permeability value of greater than 10,
    a coil arranged in the electrically insulating coil carrier,
    a sample carrier that is removable via the closable opening, wherein the sample carrier has a relative permeability value of more than 10 and is designed as an inductive heating element, for purposes of heating a substance to be desorbed, which is applied to the sample carrier, and the electrically insulating coil carrier and the coil are arranged spaced apart from the sample carrier by a gap, such that a magnetic flux, generated by an alternating current flowing in the coil, flows through the sample carrier via the electrically insulating coil carrier and the gap.

2. The desorber according to claim 1, further comprising an electronic control and a regulation unit designed to control inductive heating by variation of the alternating current, wherein the electric control is effected as a function of a target temperature profile of the sample carrier.

3. The desorber according to claim 1, wherein the induction unit further comprises at least one spacer designed to hold the sample carrier, and variably to adjust a width of the gap, wherein the gap has a width of more than 0.1 mm and less than 1 mm.

4. The desorber according to claim 1, wherein the electrically insulating coil carrier has a relative permeability of more than 100 and less than 15,000.

5. The desorber according to claim 1, wherein the induction unit further comprises a temperature sensor designed to record the temperature of the sample carrier.

6. The desorber according to claim 1, wherein the electrically insulating coil carrier covers the sample carrier in its entirety.

7. The desorber according to claim 1, wherein the electrically insulating coil carrier has a shape configured to receive the coil.

8. The desorber according to claim 1, wherein the housing has an inert, heat-reflecting coating on a side facing towards the induction unit.

9. The desorber according to claim 7, wherein the housing is filled with a gas, wherein the gas during desorption is an inert gas.

10. The desorber according to claim 1, wherein the sample carrier comprises a sample contact zone having structural features and/or structurings configured for improving sample acquisition and desorption capability.

11. The desorber according to claim 1, wherein the surface of the sample carrier has an emissivity less than 0.1.

12. The desorber according to claim 1, wherein the sample carrier is designed as a disc, a tube, or a pin.

13. The desorber according to claim 1, wherein a ratio of a layer thickness D of the sample carrier to a penetration depth δ of the magnetic field is greater than 2 and less than 10.

14. An ion mobility spectrometer configured for determining an ion mobility of a sample, the ion mobility spectrometer comprising:
- a cylindrical drift chamber for transporting ions from a grid switch to an ion detector against an axial drift gas flow,
- a cylindrical reaction chamber, adjacent to the drift chamber in the axial direction, with a sample gas inlet adjacent to the grid switch for introducing a sample gas,
- a gas outlet opposite the grid switch for discharging drift gas and sample gas,
- a local ionisation source arranged at the gas outlet, and
- the desorber according to claim 1.

15. A method for the desorption of substances of medium and low volatility at high temperatures, and the provision of the desorbed substances in an ion mobility spectrometer, with the desorber according to claim 1, wherein the method comprises:
- insertion of the sample carrier, loaded with a substance, into the desorber via the closable opening;
- inductive heating of the sample carrier by means of a high-frequency alternating magnetic field, generated by an alternating current flowing in the coil, to provide a desorbed sample;
- supply of the desorbed sample by means of the flow of a sample carrier gas flow, supplied to the desorber via the supply lines, and guided over the sample carrier via the discharge lines, directly, or indirectly via a sample gas exchanger, into a reaction chamber of the ion mobility spectrometer;
- ionisation of the desorbed sample by means of an ionisation source to provide an ionised sample gas;
- measurement of an ion current of the ionised sample gas, generated by an electric drift field, with an ion detector and evaluation of a resulting signal.

* * * * *